US012686833B2

(12) United States Patent
Nakajima

(10) Patent No.: US 12,686,833 B2
(45) Date of Patent: Jul. 21, 2026

(54) REFRIGERATOR OIL COMPOSITION AND REFRIGERATOR MIXTURE COMPOSITION

(71) Applicant: IDEMITSU KOSAN CO., LTD., Chiyoda-ku (JP)

(72) Inventor: So Nakajima, Edogawa-ku (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 795 days.

(21) Appl. No.: 17/759,962

(22) PCT Filed: Jan. 20, 2021

(86) PCT No.: PCT/JP2021/001835

§ 371 (c)(1),
(2) Date: Aug. 2, 2022

(87) PCT Pub. No.: WO2021/157357

PCT Pub. Date: Aug. 12, 2021

(65) Prior Publication Data

US 2023/0091226 A1 Mar. 23, 2023

(30) Foreign Application Priority Data

Feb. 4, 2020 (JP) ................................ 2020-017120

(51) Int. Cl.

| | |
|---|---|
| ***C10M 137/04*** | (2006.01) |
| ***C09K 5/04*** | (2006.01) |
| ***C10M 107/34*** | (2006.01) |
| ***C10M 169/04*** | (2006.01) |
| *C10N 40/30* | (2006.01) |

(52) U.S. Cl.

CPC ............ *C10M 137/04* (2013.01); *C09K 5/04* (2013.01); *C10M 107/34* (2013.01); *C10M 169/04* (2013.01); *C10M 2209/1033* (2013.01); *C10M 2223/041* (2013.01); *C10M 2223/049* (2013.01); *C10N 2040/30* (2013.01)

(58) Field of Classification Search

CPC ........... C10N 2030/06; C10N 2020/02; C10N 2030/10; C10N 2020/101; C10N 2040/30; C09K 5/045; C09K 5/04; C09K 5/041; C09K 2205/126; C10M 137/04; C10M 169/04; C10M 107/34; C10M 171/008; C10M 2209/1055; C10M 2207/026; C10M 2209/1033; C10M 2223/041; C10M 2223/06; C10M 2223/049; C10M 2209/043; C10M 2209/1085

See application file for complete search history.

(56) References Cited

U.S. PATENT DOCUMENTS 5,049,292 A * 9/1991 Grasshoff ............ C10M 169/04 252/68
5,326,486 A 7/1994 Mizui et al.
2010/0301259 A1* 12/2010 Leck ...................... C09K 5/045 252/68

FOREIGN PATENT DOCUMENTS

| | | | |
|---|---|---|---|
| JP | 56-70082 | A | 6/1981 |
| JP | 5-70789 | A | 3/1993 |
| JP | 5-86391 | A | 4/1993 |
| JP | 9-227887 | A | 9/1997 |
| JP | 9-316479 | A | 12/1997 |
| JP | 11-100586 | A | 4/1999 |
| JP | 2007-232353 | A | 9/2007 |
| JP | 2009-263666 | A | 11/2009 |

OTHER PUBLICATIONS

Partial Supplementary European Search Report issued Jan. 25, 2024 in European Patent Application No. 21750720.1, 11 pages.
Combined Chinese Office Action and Search Report issued Jun. 29, 2023 in Chinese Application No. 202180012120.1 (with full English machine translation), 14 pages.
Extended European Search Report issued Apr. 16, 2024 in European Patent Application No. 21750720.1, 10 pages.
Chinese Office Action issued Apr. 26, 2024 in Chinese Patent Application No. 202180012120.1 (with English Translation), 10 pages.

(Continued)

*Primary Examiner* — Vishal V Vasisth
(74) *Attorney, Agent, or Firm* — Oblon, McClelland, Maier & Neustadt, L.L.P.

(57) ABSTRACT

A refrigerator oil composition with a base oil (A), and a first phosphorus compound (B). The first phosphorus compound (B) is a first phosphite ester (B1) represented by formula (1) and a second phosphite ester (B2) represented by formula (2):

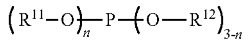

(1)

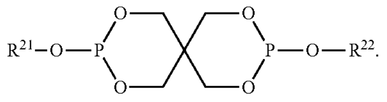

(2)

A method of producing a refrigerator oil composition by mixing a base oil (A) with a first phosphorus compound (B). A refrigerator mixture composition includes the refrigerator oil composition and a refrigerant.

11 Claims, No Drawings

(56) References Cited

OTHER PUBLICATIONS

Chinese Office Action issued Dec. 7, 2023 in Chinese Patent Application No. 202180012120.1 (with unedited computer-generated English translation), 12 pages.
European Office Action issued Dec. 16, 2024 in European Patent Application No. 21 750 720.1, 5 pages.
Japanese Office Action issued Jul. 16, 2024 in Japanese Patent Application No. 2021-575702 (with unedited computer-generated English Translation), 9 pages.
International Search Report Issued Mar. 23, 2021, in PCT/JP2021/001835, filed on Jan. 20, 2021, 3 pages.

* cited by examiner

REFRIGERATOR OIL COMPOSITION AND REFRIGERATOR MIXTURE COMPOSITION

CROSS REFERENCE TO RELATED APPLICATIONS

This application is a National Stage entry under 35 U.S.C. § 371 of PCT/JP2021/001835, filed on Jan. 20, 2021, and claims priority to Japanese Patent Application No. 2020-017120, filed on Feb. 4, 2020, the entire contents of which are incorporated herein by reference.

TECHNICAL FIELD

The present invention relates to a refrigerator oil composition and a refrigerator mixture composition.

In the present specification, "a refrigerator mixture composition" refers to a composition in which a "refrigerant" is mixed with a "refrigerator oil composition."

BACKGROUND ART

As the speed and pressure of industrial machines are recently increased and the size is decreased, mechanical elements such as compression machines, hydraulic machines, turbines, gear elements, and bearings have been operated under harsher conditions. A lubricating oil composition used in these machines is required to have a lubricating performance that can sufficiently guarantee a machine life over a long period of time even under harsh conditions.

Meanwhile, various additives are blended with the lubricating oil composition for the purpose of improving the lubricating performance. Among them, tricresyl phosphate (hereinafter, also referred to as "TCP") has conventionally been used as an additive for improving wear resistance.

For example, PTL 1 discloses a reinforcing agent of a lubricating oil, in which a predetermined amount of TCP is blended as a phosphorus extreme pressure agent, with a base oil composed of a mineral oil, a synthetic oil, or a mixed oil thereof.

CITATION LIST

Patent Literature

PTL 1: JP 11-100586 A

SUMMARY OF INVENTION

Technical Problem

In recent years, a refrigerator oil composition is also required to have a lubricating performance that can sufficiently guarantee a machine life over a long period of time under harsher conditions than before. Thus, a refrigerator oil composition having a better wear resistance than conventional ones is required.

However, as a result of intensive studies of the present inventor, it has been found that a refrigerator oil composition in which a phosphoric acid ester such as TCP is blended cannot satisfy the above requirements.

The present invention has been made in view of the above requirements, and an object thereof is to provide a refrigerator oil composition and a refrigerator mixture composition having a more excellent wear resistance.

Solution to Problem

As a result of repeated intensive studies, the present inventor has found that the above problems can be solved by a refrigerator oil composition containing a base oil and a specific phosphite ester, and has completed the present invention.

That is, the present invention relates to the followings [1] to [3].

[1] A refrigerator oil composition containing a base oil (A), and a first phosphorus compound (B), in which the first phosphorus compound (B) is at least one selected from the group consisting of a first phosphite ester (B1) represented by a following general formula (1) and a second phosphite ester (B2) represented by a following general formula (2).

$$\left(R^{11}-O\right)_{n} P \left(O-R^{12}\right)_{3-n} \quad (1)$$

[In the general formula (1), $R^{11}$ is an aromatic group represented by a following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

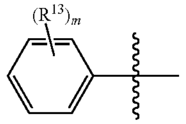

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

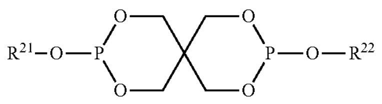

[In the general formula (2), each of $R^{21}$ and $R^{22}$ is independently an aliphatic hydrocarbon group having 10 to 30 carbon atoms.]

[2] A method of producing a refrigerator oil composition, the method including a step of mixing a base oil (A) with a first phosphorus compound (B), in which the first phosphorus compound (B) is at least one selected from the group consisting of a first phosphite ester (B1) represented by a following general formula (1) and a second phosphite ester (B2) represented by a following general formula (2).

$$\left(R^{11}-O\right)_{n} P \left(O-R^{12}\right)_{3-n} \quad (1)$$

[In the general formula (1), $R^{11}$ is an aromatic group represented by a following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

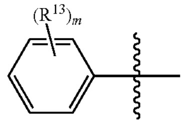

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

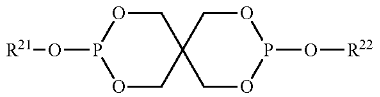

[In the general formula (2), each of $R^{21}$ and $R^{22}$ is independently an aliphatic hydrocarbon group having 10 to 30 carbon atoms.]

[3] A refrigerator mixture composition containing the refrigerator oil composition described in [1] and a refrigerant.

Advantageous Effects of Invention

According to the present invention, it is possible to provide a refrigerator oil composition and a refrigerator mixture composition having a more excellent wear resistance.

DESCRIPTION OF EMBODIMENTS

In the present specification, regarding a desirable numerical range (for example, a range of a content or the like), lower limit values and upper limit values described in stages can be combined independently from each other. For example, from the description of "preferably 10 to 90, more preferably 30 to 60," a "preferable lower limit value (10)" and a "more preferable upper limit value (60)" can be combined to form "10 to 60."

Further, the numerical range of "a lower limit value to an upper limit value" described in the present specification means that it is a lower limit value or more, and an upper limit value or less unless otherwise specified.

Further, in the present specification, the numerical value in Examples is a numerical value that may be used as an upper limit value or a lower limit value.

In the present specification, the "hydrocarbon group" means a group composed only of a carbon atom and a hydrogen atom, unless otherwise specified. The "hydrocarbon group" also includes an "aliphatic group" composed of a saturated or unsaturated straight chain or a saturated or unsaturated branched chain, an "alicyclic group" having at least one saturated or unsaturated carbon ring not having aromaticity, and an "aromatic group" having at least one aromatic ring exhibiting aromaticity such as a benzene ring.

Further, in the present specification, in a compound having a structure in which atoms are bonded in a ring, "the number of ring-forming carbon atoms" indicates the number of carbon atoms among the atoms constituting the ring itself. When the ring is substituted with a substituent, the carbon contained in the substituent is not included in the number of ring-forming carbon atoms.

Further, in a compound having a structure in which atoms are bonded in a ring, the number of ring-forming atoms indicates the number of atoms constituting the ring itself. The number of ring-forming atoms does not include atoms that do not constitute the ring (for example, a hydrogen atom that terminates a bond hand of atoms that constitute the ring), and atoms included in a substituent when the ring is substituted with the substituent.

In the present specification, in the expression of "a substituted or unsubstituted X group having a to b carbon atoms," "the number of carbon atoms (a to b)" indicates the number of carbon atoms when the X group is unsubstituted, and does not include the number of carbon atoms of a substituent when the X group is substituted.

In the present specification, "kinematic viscosity at 40° C." is also referred to as "40° C. kinematic viscosity."

[Embodiment of Refrigerator Oil Composition of the Present Invention]

The refrigerator oil composition of the present invention contains a base oil (A) and a first phosphorus compound (B).

The first phosphorus compound (B) is at least one selected from the group consisting of a first phosphite ester (B1) represented by the following general formula (1) and a second phosphite ester (B2) represented by the following general formula (2).

$$\left(R^{11}-O\right)_{n} P \left(O-R^{12}\right)_{3-n} \qquad (1)$$

[In the general formula (1), $R^{11}$ is an aromatic group represented by the following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

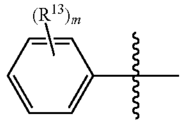

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

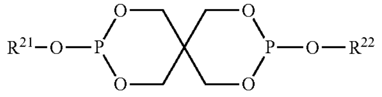

[In the general formula (2), each of $R^{21}$ and $R^{22}$ is independently a linear or branched aliphatic hydrocarbon group having 10 to 30 carbon atoms.]

In order to satisfy recent demands for a refrigerator oil composition, the present inventor has performed intensive studies on additives that may improve the wear resistance of the refrigerator oil composition even under harsher conditions than before.

First, TCP that has been conventionally used as an additive for improving the wear resistance has been examined, and as a result, it has been confirmed that a sufficient wear-resistance improving effect is not obtained. Next, triphenyl phosphine oxide (hereinafter, also referred to as "TPPO") has been examined, and as a result, it has been found that as in TCP, a sufficient wear-resistance improving effect is not obtained. From these results, it has been thought that when a phosphoric acid ester such as TCP or an organic phosphine oxide compound such as TPPO is used, a sufficient wear-resistance improving effect is not obtained.

Therefore, the present inventor has performed further intensive studies, and as a result, it has been found that the first phosphite ester (B1) represented by the general formula (1) and the second phosphite ester (B2) represented by the general formula (2) exert a remarkable wear-resistance improving effect. Then, various studies have been further performed again, and the present invention has been completed.

In the following description, the "base oil (A)" and the "first phosphorus compound (B)" are also referred to as a "component (A)" and a "component (B)," respectively.

Further, the first phosphite ester (B1) represented by the general formula (1) and the second phosphite ester (B2) represented by the general formula (2) are also referred to as a "component (B1)" and a "component (B2)," respectively.

The refrigerator oil composition according to one aspect of the present invention may be composed of only the component (A) and the component (B), but components other than the component (A) and the component (B) may be contained in a range where the effect of the present invention is not impaired.

In the refrigerator oil composition according to one aspect of the present invention, the total content of the component (A) and the component (B) is preferably 80% by mass to 100% by mass, more preferably 85% by mass to 100% by mass, further preferably 90% by mass to 100% by mass based on the total amount (100% by mass) of the refrigerator oil composition.

Hereinafter, each component contained in the refrigerator oil composition of the present invention will be described in detail.

<Base Oil (A)>

The refrigerator oil composition of the present invention contains a base oil (A).

In the refrigerator oil composition according to one aspect of the present invention, the content of the base oil (A) is preferably 85.0% by mass or more, more preferably 90.0% by mass or more, further preferably 95.0% by mass or more based on the total amount (100% by mass) of the refrigerator oil composition. Further, it is preferably 99.5% by mass or less, more preferably 99.3% by mass or less, further preferably 99.2% by mass or less, still further preferably 99.1% by mass or less, still further preferably 99.0% by mass or less.

As for the base oil (A), base oils usually used in the refrigerator oil composition can be used without particular limitation. For example, as for the base oil (A), at least one selected from the group consisting of synthetic oil and mineral oil can be used.

Here, in the refrigerator oil composition according to one aspect of the present invention, the base oil (A) preferably contains at least one type of base oil (hereinafter, also referred to as a "base oil (A1)") selected from the group consisting of polyalkyleneglycols (hereinafter, also referred to as "PAG"), polyvinylethers (hereinafter, also referred to as "PVE"), a copolymer of poly(oxy)alkylene glycol or its monoether and polyvinylether (hereinafter, also referred to as "ECP"), polyolesters (hereinafter, also referred to as "POE"), and mineral oil from the viewpoint of improving the thermal stability of the refrigerator oil composition, and more preferably contains at least one type of base oil (hereinafter, also referred to as a "base oil (A2)") selected from the group consisting of PVE and PAG from the viewpoint of improving compatibility with a refrigerant, the viewpoint of improving hydrolysis resistance, and the viewpoint of improving the thermal stability of the refrigerator oil composition. In a more preferred aspect, the base oil (A) contains PVE (hereinafter, also referred to as a "base oil (A3)") or contains PAG (hereinafter, also referred to as a "base oil (A4)"), and still more preferably contains PAG (hereinafter, also referred to as a "base oil (A4)") from the viewpoint of making it easier to exert the wear-resistance improving effect.

Hereinafter, PVE, PAG, ECP, POE, and mineral oil will be described in detail.

(Polyvinylethers (PVE))

PVE may be a polymer having at least one type of vinyl ether-derived structural unit.

When the base oil (A) contains PVE, the PVE may be used either alone or in combination of two or more thereof.

The PVE is preferably a polymer having at least one type of vinyl ether-derived structural unit and having an alkyl group having 1 to 4 carbon atoms in the side chain from the viewpoint of compatibility with a refrigerant. The alkyl group is preferably a methyl group or an ethyl group, more preferably a methyl group from the viewpoint of further improving the compatibility with a refrigerant.

The PVE is preferably a polymer (A-1) having at least one type of structural unit represented by the following general formula (A-1).

(A-1)

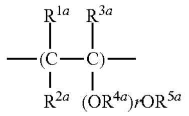

In the formula (A-1), each of $R^{1a}$, $R^{2a}$, and $R^{3a}$ independently represents a hydrogen atom or a hydrocarbon group having 1 to 8 carbon atoms. $R^{4a}$ represents a divalent hydrocarbon group having 2 to 10 carbon atoms. $R^{5a}$ represents a hydrocarbon group having 1 to 10 carbon atoms. r is the number of repeating units of $OR^{4a}$, and is usually 0 to 10, preferably 0 to 5, more preferably 0 to 3, further preferably 0. When a plurality of $OR^{4a}$'s is present in the structural unit represented by the general formula (A-1), the $OR^{4a}$'s may be the same or different from each other.

Examples of the hydrocarbon group having 1 to 8 carbon atoms and represented by $R^{1a}$, $R^{2a}$ and $R^{3a}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups.

Here, "various" means a "linear, branched, or cyclic" hydrocarbon group, and for example, "various butyl groups" means various butyl groups such as "an n-butyl group, a sec-butyl group, an isobutyl group, a tert-butyl group, and a cyclobutyl group." Further, it is illustrated that the group having a cyclic structure includes a position isomer such as an ortho form, a meta form, or a para form, and the same applies hereinafter.

The number of carbon atoms of the hydrocarbon group represented by $R^{1a}$, $R^{2a}$, and $R^{3a}$ is preferably 1 to 6, more preferably 1 to 3.

Each of $R^{1a}$, $R^{2a}$, and $R^{3a}$ is independently preferably a hydrogen atom or an alkyl group having 1 to 8 carbon atoms, more preferably a hydrogen atom or an alkyl group having 1 to 3 carbon atoms.

Examples of the divalent hydrocarbon group having 2 to 10 carbon atoms and represented by $R^{4a}$ include: divalent aliphatic groups such as an ethylene group, a 1,2-propylene group, a 1,3-propylene group, various butylene groups, various pentylene groups, various hexylene groups, various heptylene groups, various octylene groups, various nonylene groups, and various decylene groups; divalent alicyclic groups such as cyclohexane, methylcyclohexane, ethylcyclohexane, dimethylcyclohexane, and propylcyclohexane; divalent aromatic groups such as various phenylene groups, various methylphenylene groups, various ethylphenylene groups, various dimethylphenylene groups, and various naphthylenes; a divalent alkyl aromatic group having a monovalent binding site at each of the alkyl group moiety and the aromatic moiety of an alkyl aromatic hydrocarbon, such as toluene, xylene, or ethylbenzene; and a divalent alkyl aromatic group having a binding site at the alkyl group moiety of a polyalkyl aromatic hydrocarbon, such as xylene or diethylbenzene.

The number of carbon atoms of the hydrocarbon group represented by $R^{4a}$ is preferably 2 to 6, more preferably 2 to 4.

$R^{4a}$ is preferably a divalent aliphatic group having 2 to 10 carbon atoms, more preferably a divalent aliphatic group having 2 to 4 carbon atoms.

Examples of the hydrocarbon group having 1 to 10 carbon atoms and represented by $R^{5a}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various pnenylpropyl groups, and various phenylbutyl groups.

The number of carbon atoms of the hydrocarbon group represented by $R^{5a}$ is preferably 1 to 8, more preferably 1 to 6.

$R^{5a}$ is preferably an alkyl group having 1 to 6 carbon atoms, more preferably an alkyl group having 1 to 4 carbon atoms, further preferably a methyl group or an ethyl group, still more preferably a methyl group from the viewpoint of further improving the compatibility with a refrigerant.

For the structural unit represented by the general formula (A-1), the number of units (the degree of polymerization) is appropriately selected according to the kinematic viscosity required for the base oil (A).

Further, the polymer having the structural unit represented by the general formula (A-1) may be a homopolymer having only one type of structural unit, or may be a copolymer having two or more types of structural units. When the polymer is a copolymer, the form of copolymerization is not particularly limited, and may be any of a block copolymer, a random copolymer, and a graft copolymer.

A monovalent group derived from saturated hydrocarbon, ether, alcohol, ketone, amide, nitrile, etc. may be introduced into a terminal portion of the polymer (A-1). Among these, it is preferable that a group represented by the following general formula (A-1-i) is one terminal portion of the polymer (A-1).

(A-1-i)

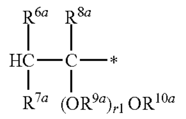

In the formula (A-1-i), * represents a position of bonding to a carbon atom in the structural unit represented by the general formula (A-1).

In the formula (A-1-i), each of $R^{6a}$, $R^{7a}$, and $R^{8a}$ independently represents a hydrogen atom or a hydrocarbon group having 1 to 8 carbon atoms, and is preferably a hydrogen atom or a hydrocarbon group having 1 to 6 carbon atoms, more preferably a hydrogen atom or an alkyl group having 1 to 3 carbon atoms.

Examples of the hydrocarbon group having 1 to 8 carbon atoms and represented by $R^{6a}$, $R^{7a}$, and $R^{8a}$ include the same as those enumerated as the hydrocarbon group having 1 to 8 carbon atoms and represented by $R^{1a}$, $R^{2a}$, and $R^{3a}$ in the general formula (A-1).

In the formula (A-1-i), $R^{9a}$ represents a divalent hydrocarbon group having 2 to 10 carbon atoms, and is preferably a divalent hydrocarbon group having 2 to 6 carbon atoms, more preferably a divalent aliphatic group having 2 to 4 carbon atoms.

In the formula (A-1-i), r1 is the number of repeating units of $OR^{9a}$, and is usually 0 to 10, preferably 0 to 5, more preferably 0 to 3, further preferably 0. When a plurality of $OR^{9a}$'s is present in the structural unit represented by the general formula (A-1-i), the $OR^{9a}$'s may be the same or different from each other.

Examples of the divalent hydrocarbon group having 2 to 10 carbon atoms and represented by $R^{9a}$ include the same as those enumerated as the divalent hydrocarbon group having 2 to 10 carbon atoms and represented by $R^{4a}$ in the general formula (A-1).

In the formula (A-1-i), $R^{10a}$ represents a hydrocarbon group having 1 to 10 carbon atoms, and a hydrocarbon group having 1 to 8 carbon atoms is preferred, and an alkyl group having 1 to 8 carbon atoms is more preferred.

As for $R^{10a}$, an alkyl group having 1 to 6 carbon atoms is preferred when r1 in the general formula (A-1-i) is 0, and an alkyl group having 1 to 4 carbon atoms is preferred when r1 is 1 or more.

Examples of the hydrocarbon group having 1 to 10 carbon atoms and represented by $R^{10a}$ a include the same as those enumerated as the hydrocarbon group having 1 to 10 carbon atoms and represented by $R^{5a}$ in the general formula (A-1).

Further, regarding the polymer (A-1), when one terminal portion is a group represented by the general formula (A-1-i), the other terminal portion is preferably any of a group represented by the general formula (A-1-i), a group represented by the following general formula (A-1-ii), a group represented by the following general formula (A-1-iii), and a group having an olefinically unsaturated bond.

(A-1-ii)

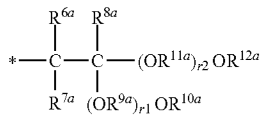

(A-1-iii)

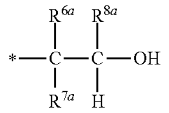

In the formulas (A-1-ii) and (A-1-iii), $R^{6a}$, $R^{7a}$, $R^{8a}$, $R^{9a}$, $R^{10a}$, and r1 are the same as those specified in the general formula (A-1-i). Further, in the formula (A-$R^{11a}$, $R^{12a}$, and r2 are the same as $R^{9a}$, $R^{10a}$ and r1 specified in the general formula (A-1-i), respectively.

In one aspect of the present invention, it is desirable that the polyvinyl-based compound having the structural unit represented by the general formula (A-1) is polyethyl vinylether in which all of $R^{1a}$, $R^{2a}$, and $R^{3a}$ are hydrogen atoms, r is 0, and $R^{5a}$ is an ethyl group from the viewpoint of improving the solubility in a refrigerant and the thermal stability.

Further, from the same viewpoint, it is desirable that the polyvinyl-based compound having the structural unit represented by the general formula (A-1) is a copolymer between polyethyl vinylether in which all of $R^{1a}$, $R^{2a}$, and $R^{3a}$ are hydrogen atoms, r is 0, and $R^{5a}$ is an ethyl group, and polyisobutyl vinylether in which all of $R^{1a}$, $R^{2a}$, and $R^{3a}$ are hydrogen atoms, r is 0, and $R^{5a}$ is an isobutyl group. In this case, the content ratio of the structural unit of ethyl vinylether to the structural unit of isobutyl vinylether [(structural unit of ethyl vinylether)/(structural unit of isobutyl vinylether)] is preferably 50/50 to 99/1 in terms of molar ratio, more preferably 70/30 to 99/1, further preferably 80/20 to 95/5, still further preferably 85/15 to 95/5.

In the present invention, the polyvinylether-based compound may be used either alone or in combination of two or more thereof.

(Polyalkyleneglycols (PAG))

PAG is preferably a polymer (A-2) represented by the following general formula (A-2).

$$R^{13a}—[(OR^{14a})_p—OR^{15a}]_q \quad \text{(A-2)}$$

When the base oil (A) contains PAG, the PAG may be used either alone or in combination of two or more thereof.

In the general formula (A-2), $R^{13a}$ represents a hydrogen atom, a monovalent hydrocarbon group having 1 to 10 carbon atoms, an acyl group having 2 to 10 carbon atoms, a 2 to 6-valent hydrocarbon group having 1 to 10 carbon atoms, or a substituted or unsubstituted hetrocyclic group having 3 to 10 ring-forming atoms. $R^{14a}$ represents an alkylene group having 2 to 4 carbon atoms, and $R^{15a}$ represents a hydrogen atom, a monovalent hydrocarbon group having 1 to 10 carbon atoms, an acyl group having 2 to 10 carbon atoms or a substituted or unsubstituted hetrocyclic group having 3 to 10 ring-forming atoms.

Examples of a substituent that may be possessed by the hetrocyclic group include an alkyl group having 1 to 10 (preferably 1 to 6, more preferably 1 to 3) carbon atoms; a cycloalkyl group having 3 to 10 (preferably 3 to 8, more preferably 5 or 6) ring-forming carbon atoms; an aryl group having 6 to 18 (preferably 6 to 12) ring-forming carbon atoms; a halogen atom (a fluorine atom, a chlorine atom, a bromine atom, an iodine atom); a cyano group; a nitro group; a hydroxy group; and an amino group.

These substituents may be further substituted with any of the above-described substituents.

q is an integer of 1 to 6, preferably an integer of 1 to 3, more preferably 1.

q is determined according to the number of binding sites of $R^{13a}$ in the general formula (A-2). For example, when $R^{13a}$ is an alkyl group or an acyl group, n is 1, and when $R^{13a}$ is a hydrocarbon group or a hetrocyclic group, and the valence of the group is 2, 3, 4, 5, or 6-valence, n is 2, 3, 4, 5, or 6, respectively.

p is the number of repeating units of $OR^{14a}$, and is usually 1 or more, preferably the number by which p×q becomes 6 to 80. The value of p is a value that is appropriately set in order to adjust the 40° C. kinematic viscosity of the base oil (A) to an appropriate range, and is not particularly limited as long as the 40° C. kinematic viscosity is adjusted to fall within an appropriate range.

$R^{14a}$'s may be the same or different from each other. Further, when q is 2 or more, $R^{15a}$'s in one molecule may be the same or different from each other.

Examples of the monovalent hydrocarbon group represented by $R^{13a}$ and $R^{15a}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various pnenylpropyl groups, and various phenylbutyl groups. The alkyl group may be either linear or branched.

The number of carbon atoms of the monovalent hydrocarbon group represented by $R^{13a}$ and $R^{15a}$ is preferably 1 to 10, more preferably 1 to 6, further preferably 1 to 3 from the viewpoint of the compatibility with a refrigerant.

The hydrocarbon group moiety included in the acyl group that has 2 to 10 carbon atoms and is represented by $R^{13a}$ and $R^{15a}$ may be any of a straight chain, a branched chain, and a ring. Examples of the alkyl group moiety include those having 1 to 9 carbon atoms among the above-described hydrocarbon groups represented by $R^{13a}$ and $R^{15a}$.

The number of carbon atoms of the acyl group represented by $R^{13a}$ and $R^{15a}$ is preferably 2 to 8, more preferably 2 to 6 from the viewpoint of the compatibility with a refrigerant.

Examples of the 2 to 6-valent hydrocarbon group represented by $R^{13a}$ include a residue obtained by further removing 1 to 5 hydrogen atoms from the above-described monovalent hydrocarbon group represented by $R^{13a}$, and a residue obtained by removing a hydroxy group from polyhydric alcohol such as trimethylolpropane, glycerin, pentaerythritol, sorbitol, 1,2,3-trihydroxycyclohexane, or 1,3,5-trihydroxycyclohexane.

The number of carbon atoms of the 2 to 6-valent acyl group represented by $R^{13a}$ is preferably 2 to 10, more preferably 2 to 6 from the viewpoint of the compatibility with a refrigerant.

The hetrocyclic group represented by $R^{13a}$ and $R^{15a}$, is preferably an oxygen atom-containing hetrocyclic group or a sulfur atom-containing hetrocyclic group. The hetrocyclic group may be a saturated ring or an unsaturated ring.

Examples of the oxygen atom-containing hetrocyclic group include residues obtained by removing 1 to 6 hydrogen atoms included in oxygen atom-containing saturated heterocycles such as ethylene oxide, 1,3-propyleneoxide, tetrahydrofuran, tetrahydropyran, and hexamethylene oxide; and oxygen atom-containing unsaturated heterocycles such as acetylene oxide, furan, pyran, oxycycloheptatriene, isobenzofuran, and isochromen.

Further, examples of the sulfur atom-containing hetrocyclic group include residues obtained by removing 1 to 6 hydrogen atoms included in sulfur atom-containing saturated heterocycles such as ethylene sulfide, trimethylene sulfide, tetrahydrothiophene, tetrahydrothiopyran, and hexamethylene sulfide, and sulfur atom-containing unsaturated heterocycles such as acetylene sulfide, thiophene, thiapyran, and thiotripyridene.

The hetrocyclic group represented by $R^{13a}$ and $R^{15a}$ may have a substituent, and the substituent may be bound to an oxygen atom in the general formula (A-2). As described above, the substituent is preferably an alkyl group having 1 to 6 carbon atoms, and more preferably an alkyl group having 1 to 3 carbon atoms.

The number of ring-forming atoms of the hetrocyclic group is preferably 3 to 10, more preferably 3 to 6 from the viewpoint of the compatibility with a refrigerant.

Examples of the alkylene group represented by $R^{14a}$ include: an alkylene group having 2 carbon atoms, such as a dimethylene group ($—CH_2CH_2—$), and an ethylene group ($—CH(CH_3)—$); an alkylene group having 3 carbon atoms, such as a trimethylene group ($—CH_2CH_2CH_2—$), a propylene group ($—CH(CH_3)CH_2—$), a propylidene group ($—CHCH_2CH_3—$), and an isopropylidene group ($—C(CH_3)_2—$); and an alkylene group having 4 carbon atoms, such as a tetramethylene group ($—CH_2CH_2CH_2CH_2—$), a 1-methyltrimethylene group ($—CH(CH_3)CH_2CH_2—$), a 2-methyltrimethylene group ($—CH_2CH(CH_3—)CH_2—$), and a butylene group ($—C(CH_3)_2CH_2—$). Among these, as for $R^{14a}$, a propylene group ($—CH(CH_3)CH_2—$) is preferred.

In the polymer (A-2) represented by the general formula (A-2), the content of an oxypropylene unit ($—OCH(CH_3)CH_2—$) is preferably 50 mol % or more, based on the total amount (100 mol %) of oxyalkylene ($OR^{14a}$) in the polymer (A-2), more preferably 65 mol % or more, further preferably 80 mol % or more.

Among the polymers (A-2) represented by the general formula (A-2), preferred is at least one selected from the group consisting of polyoxypropyleneglycol dimethylether represented by the following general formula polyoxyethylenepolyoxypropylene glycol dimethylether represented by the following general formula (A-2-ii), polyoxypropyleneglycol monobutylether represented by the following general formula (A-2-iii), polyoxypropyleneglycol monomethylether represented by the following general formula (A-2-iv), and polyoxypropyleneglycol diacetate.

(A-2-i)

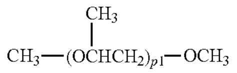

(In the formula (A-2-i), p 1 represents a number of 1 or more, preferably a number of 6 to 80.)

(A-2-ii)

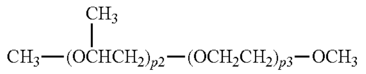

(In the formula (A-2-ii), each of p2 and p3 independently represents a number of 1 or more, preferably a number by which the value of p2+p3 becomes 6 to 80.)

(A-2-iii)

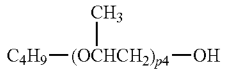

(In the formula (A-2-iii), p4 represents a number of 1 or more, preferably a number of 6 to 80.)

(A-2-iv)

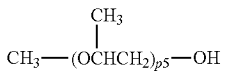

(In the formula (A-2-iv), p5 represents a number of 1 or more, preferably a number of 6 to 80.)

p1 in the general formula (A-2-i), p2 and p3 in the general formula (A-2-ii), p4 in the general formula (A-2-iii), and p5 in the general formula (A-2-iv) may be appropriately selected according to the kinematic viscosity required for the base oil (A).

(Copolymer (ECP) of poly(oxy)alkyleneglycol or its Monoether and polyvinylether)

A copolymer (ECP) of poly(oxy)alkyleneglycol or its monoether and polyvinylether may be a copolymer having a structural unit derived from poly(oxy)alkyleneglycol or its monoether, and a structural unit derived from polyvinylether.

The "poly(oxy)alkyleneglycol" refers to both polyalkyleneglycol and polyoxyalkyleneglycol.

Further, when the base oil (A) contains ECP, the ECP may be used either alone or in combination of two or more thereof.

Among the ECPs, a copolymer (A-3-i) represented by the following general formula (A-3-i) or a copolymer (A-3-ii) represented by the general formula (A-3-ii) is preferred.

(A-3-i)

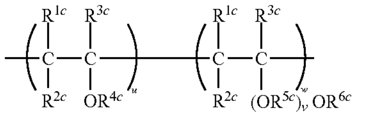

(A-3-ii)

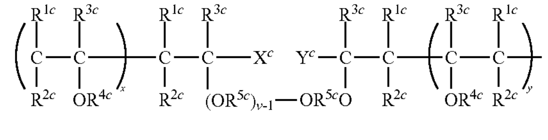

In the general formulas (A-3-i) and (A-3-ii), each of $R^{1c}$, $R^{2c}$, and $R^{3c}$ independently represents a hydrogen atom or a hydrocarbon group having 1 to 8 carbon atoms.

Each $R^{4c}$ independently represents a hydrocarbon group having 1 to 10 carbon atoms.

Each $R^{5c}$ independently represents an alkylene group having 2 to 4 carbon atoms.

Each $R^{6c}$ independently represents a hydrogen atom, an alkyl group having 1 to 20 carbon atoms, a substituted or unsubstituted alicyclic group having 3 to 20 ring-forming carbon atoms, a substituted or unsubstituted aromatic group having 6 to 24 ring-forming carbon atoms, an acyl group having 2 to 20 carbon atoms, or an oxygen-containing hydrocarbon group having 2 to 50 carbon atoms.

When $R^{1c}$'s, $R^{2c}$'s, $R^{3c}$'s, $R^{4c}$'s, $R^{5c}$'s, and $R^{6c}$'s are present, they may be the same or different from each other in the structural units.

Each of $X^C$ and $Y^C$ independently represents a hydrogen atom, a hydroxy group, or a hydrocarbon group having 1 to 20 carbon atoms.

v in the general formulas (A-3-i) and (A-3-ii) is an average value of the number of units represented by $OR^{5c}$, and represents a number of 1 or more, preferably a number of 1 to 50. When a plurality of $OR^{5c}$'s is present, the $OR^{5c}$'s may be the same or different from each other. "$OR^{5c}$" represents a structural unit derived from poly(oxy)alkyleneglycol or monoether thereof.

u in the general formula (A-3-i) represents a number of 0 or more, preferably a number of 0 to 50, and w represents a number of 1 or more, preferably a number of 1 to 50.

Each of x and y in the general formula (A-3-ii) independently represents a number of 1 or more, preferably a number of 1 to 50.

the values of the v, u, w, x, and y may be adjusted according to the hydroxyl value required for the base oil (A), and are not particularly limited.

the form of the copolymerization in the copolymer (A-3-i) and the copolymer (A-3-ii) is not particularly limited, and may be a block copolymer, a random copolymer, or a graft copolymer.

Examples of the hydrocarbon group having 1 to 8 carbon atoms, which may be selected as $R^{1c}$, $R^{2c}$, and $R^{3c}$, include the same as the monovalent hydrocarbon groups having 1 to 8 carbon atoms, which may be selected as $R^{1a}$, $R^{2a}$, and $R^{3a}$ in the general formula (A-1).

The number of carbon atoms of the hydrocarbon group that may be selected as $R^{1c}$, $R^{2c}$, and $R^{3c}$ is preferably 1 to 8, more preferably 1 to 6, further preferably 1 to 3.

Each of $R^{1c}$, $R^{2c}$, and $R^{3c}$ is independently preferably a hydrogen atom or an alkyl group having 1 to 8 carbon atoms, more preferably a hydrogen atom or an alkyl group having 1 to 6 carbon atoms, further preferably a hydrogen atom or an alkyl group having 1 to 3 carbon atoms.

Further, it is desirable that at least one of $R^{1c}$, $R^{2c}$, and $R^{3c}$ is a hydrogen atom, and it is more desirable that all of $R^{1c}$, $R^{2c}$, and $R^{3c}$ are hydrogen atoms.

Examples of the hydrocarbon group having 1 to 10 carbon atoms, which may be selected as $R^{4c}$, include the same as the hydrocarbon groups having 1 to 10 carbon atoms, which may be selected as $R^{5a}$ in the general formula (A-1).

The number of carbon atoms of the hydrocarbon group that may be selected as $R^{4c}$ is preferably 1 to 8, more preferably 1 to 6, further preferably 1 to 4.

Examples of the alkylene group, which may be selected as $R^{5c}$, include the same as the alkylene groups having 2 to 4 carbon atoms, which may be selected as $R^{14a}$ in the general formula (A-2), and a propylene group ($—CH(CH_3)CH_2—$) is preferred.

In the copolymer (A-3-i) or the copolymer (A-3-ii), the content of the oxypropylene unit ($—OCH(CH_3)CH_2—$) is preferably 50 mol % to 100 mol % based on the total amount (100 mol %) of oxyalkylene ($OR^{5c}$) that is the structural unit derived from poly(oxy)alkyleneglycol or its monoether in the copolymer (A-3-i) or the copolymer (A-3-ii), more preferably 65 mol % to 100 mol %, further preferably 80 mol % to 100 mol %.

Examples of the alkyl group having 1 to 20 carbon atoms, which may be selected as $R^{6c}$, include a methyl group, an ethyl group, various propyl groups, various butyl groups, various pentyl groups, various hexyl groups, various heptyl groups, various octyl groups, various nonyl groups, and various decyl groups.

The number of carbon atoms of the alkyl group is preferably 1 to 10, more preferably 1 to 6, further preferably 1 to 3.

Examples of the alicyclic group having 3 to 20 ring-forming carbon atoms, which may be selected as $R^{6c}$, include a cyclopropyl group, a cyclobutyl group, a cyclopentyl group, a cyclohexyl group, a cycloheptyl group, a cyclooctyl group, a cyclononyl group, and a cyclodecyl group.

The number of ring-forming carbon atoms of the alicyclic group is preferably 3 to 10, more preferably 3 to 8, further preferably 3 to 6.

The alicyclic group may have the above-described substituent, and the substituent is preferably an alkyl group.

Examples of the aromatic group having 6 to 24 ring-forming carbon atoms, which may be selected as $R^{6c}$, include a phenyl group, a naphthyl group, an anthracenyl group, and a phenanthryl group.

The number of ring-forming carbon atoms of the aromatic group is preferably 6 to 18, more preferably 6 to 12.

The aromatic group may have the above-described substituent, and the substituent is preferably an alkyl group.

Examples of the acyl group having 2 to 20 ring-forming carbon atoms, which may be selected as $R^{6c}$, include an acetyl group, a propionyl group, a butyryl group, an isobutyryl group, a valeryl group, an isovaleryl group, a piperoyl group, a benzoyl group, and a toluoyl group.

The number of carbon atoms of the acyl group is preferably 2 to 10, preferably 2 to 8, further preferably 2 to 6.

Examples of the oxygen-containing hydrocarbon group having 2 to 50 carbon atoms, which may be selected as $R^{6c}$, include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

The number of carbon atoms of the carbon-containing hydrocarbon group is preferably 2 to 20, more preferably 2 to 10, further preferably 2 to 6.

Examples of the hydrocarbon group having 1 to 20 carbon atoms, which may be selected as $X^C$ and $Y^C$, include an alkyl group having 1 to 20 (preferably 1 to 10, more preferably 1 to 6, further preferably 1 to 3) carbon atoms, a substituted or unsubstituted cycloalkyl group having 3 to 20 (preferably 3 to 10, more preferably 3 to 8, further preferably 3 to 6) ring-forming carbon atoms, a substituted or unsubstituted phenyl group, a substituted or unsubstituted naphthyl group, and an arylalkyl group having 7 to 20 (preferably 7 to 13) carbon atoms.

(Polyolesters (POE))

Examples of POE include esters of a diol or a polyol, and a fatty acid. When the base oil (A) contains POE, the POE may be used either alone or in combination of two or more thereof.

The POE is preferably an ester of a diol or a polyol having 3 to 20 hydroxy groups, or a fatty acid having 3 to 20 carbon atoms.

Examples of the diol include ethylene glycol, 1,3-propanediol, propyleneglycol, 1,4-butanediol, 1,2-butanediol, 2-methyl-1,3-propanediol, 1,5-pentanediol, neopentylglycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Examples of the polyol include: polyhydric alcohols such as trimethylolethane, trimethylolpropane, trimethylolbutane, di(trimethylolpropane), tri-(trimethylolprop ane), pentaerythritol, di(pentaerythritol), tri-(pentaerythritol), glycerin, polyglycerin (dimer to 20-mer of glycerin), 1,3,5-pentanetriol, sorbitol, sorbitan, sorbitolglycerin condensate, adonitol, arabitol, xylitol, and mannitol; saccharides such as xylose, arabinose, ribose, rhamnose, glucose, fructose, galactose, mannose, sorbose, cellobiose, maltose, isomaltose, trehalose, sucrose, raffinose, gentianose, and melezitose; and partially etherified products, and methylglucosides (glycosides) thereof.

Among these, preferred are hindered alcohols such as neopentylglycol, trimethylolethane, trimethylolpropane, trimethylolbutane, di(trimethylolpropane), tri-(trimethylolpropane), pentaerythritol, di(pentaerythritol), and tri-(pentaerythritol). The hindered alcohol means alcohol having a quaternary carbon atom bound to four carbon atoms.

The number of carbon atoms of the fatty acid is preferably 3 or more, more preferably 4 or more, further preferably 5 or more, still further preferably 8 or more from the viewpoint of the lubricating performance, and is preferably 20 or less, more preferably 16 or less, further preferably 12 or less, still further preferably 10 or less from the viewpoint of the compatibility with a refrigerant.

The number of carbon atoms of the fatty acid also includes the carbon atom of the carboxy group (—COOH) included in the fatty acid.

Further, although the fatty acid may be either a linear fatty acid or a branched fatty acid, from the viewpoint of the lubricating performance, a linear fatty acid is preferred, and from the viewpoint of the hydrolysis stability, a branched fatty acid is preferred. Furthermore, the fatty acid may be either a saturated fatty acid or an unsaturated fatty acid.

Examples of the fatty acid include linear or branched ones, such as isobutyric acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid, and so-called neo acids in which the acarbon atom is quaternary.

More specifically, preferred are isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, and 3,5,5-trimethylhexanoic acid.

The POE may be a partial ester in which some of hydroxy groups included in the polyol remain without being esterified, or a complete ester in which all the hydroxy groups are esterified. Further, the POE may be a mixture of a partial ester and a complete ester, but is preferably a complete ester.

As for the POE, from the viewpoint of more excellent hydrolysis stability, esters of hindered alcohols such as neopentylglycol, trimethylolethane, trimethylolpropane, trimethylolbutane, di(trimethylolpropane), tri-(trimethylolpropane), pentaerythritol, di(pentaerythritol), and tri-(pentaerythritol) are preferred, and esters of neopentylglycol, trimethylolethane, trimethylolpropane, trimethylolbutane, and pentaerythritol are more preferred. Furthermore, from the viewpoint that the compatibility with a refrigerant and the hydrolysis stability are particularly excellent, an ester of pentaerythritol is further preferred.

Specific examples of the preferable POE include: a diester of neopentylglycol with one type or two or more types of fatty acids selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane with one type or two or more types of fatty acids selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane with one type or two or more types of fatty acids selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane with one type or two or more types of fatty acids selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol with one type or two or more types of fatty acids selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

An ester of two or more types of fatty acids may be a mixture of two or more types of esters, each having one type of fatty acid and a polyol. Among the POEs, an ester of two or more types of mixed fatty acids with polyol is preferred from the viewpoint of the improvement of low temperature characteristics and the compatibility with a refrigerant.

(Mineral Oil)

Examples of the mineral oil include: a refined oil obtained by subjecting a lubricating oil fraction obtained through distillation under reduced pressure on an atmospheric residual oil obtained by distilling a paraffinic crude oil, an intermediate-based crude oil, or a naphthene-based crude oil at atmospheric pressure or distilling a crude oil at atmospheric pressure, to at least one of treatments such as solvent deasphalting, solvent extraction, hydrocracking, solvent dewaxing, catalytic dewaxing, and hydrorefining; and an oil produced by isomerizing mineral oil-based wax.

When the base oil (A) contains a mineral oil, the mineral oil may be used either alone or in combination of two or more thereof.

Preferred Embodiment of Base Oil (A)

In the refrigerator oil composition according to one aspect of the present invention, the main component of the base oil (A) is preferably the base oil (A1), more preferably the base oil (A2), further preferably the base oil (A3) or the base oil (A4). The "main component" in the present specification means a component whose content is highest.

In the base oil (A), the content of the base oil (A1), the base oil (A2), the base oil (A3), or the base oil (A4) is preferably 50 to 100% by mass based on the total amount (100% by mass) of the base oil (A), more preferably 60 to 100% by mass, further preferably 70 to 100% by mass, still further preferably 80 to 100% by mass, still further preferably 90 to 100% by mass.

The base oil (A) may further contain another base oil in addition to the base oil (A1), the base oil (A2), the base oil (A3), or the base oil (A4), within a range where the effect of the present invention is not impaired.

Examples of the other base oil include polyesters, polycarbonates, hydrides of α-olefin oligomers, alicyclic hydrocarbon compounds, alkylated aromatic hydrocarbon compounds, and synthetic oils such as oils produced by isomerizing GTL WAX (gas to liquid wax) produced by the Fischer-Tropsch process or the like, which do not correspond to the above-described PVE, PAG, ECP, and POE.

(40° C. Kinematic Viscosity of Base Oil (A))

The 40° C. kinematic viscosity of the base oil (A) is preferably 5 to 120 $mm^2/s$, more preferably 10 to 110 $mm^2/s$, further preferably 30 to 100 $mm^2/s$. When the 40° C. kinematic viscosity of the base oil (A) falls within the above range, the wear resistance becomes better.

In the present specification, the 40° C. kinematic viscosity is a value measured in accordance with JIS K 2283:2000.

<First Phosphorus Compound (B)>

The refrigerator oil composition of the present invention contains a first phosphorus compound (B).

The first phosphorus compound (B) is at least one selected from the group consisting of a first phosphite ester (B1) and a second phosphite ester (B2).

Since the refrigerator oil composition of the present invention contains the first phosphorus compound (B), a remarkable wear-resistance improving effect is exerted. When the first phosphorus compound (B) is not contained, a remarkable wear-resistance improving effect is not exerted, and thus the wear resistance of the refrigerator oil composition cannot be improved under harsh conditions.

Hereinafter, the first phosphite ester (B1) and the second phosphite ester (B2) used as the first phosphorus compound (B) will be described in detail.

(First Phosphite Ester (B1))

The first phosphite ester (B1) is a compound represented by the following general formula (1).

$$\left(R^{11}-O\right)_n P \left(O-R^{12}\right)_{3-n} \qquad (1)$$

In the general formula (1), $R^{11}$ is an aromatic group represented by the following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.

(1a)

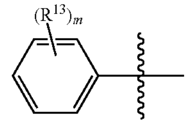

In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.

The first phosphite ester (B1) may be used either alone or in combination of two or more thereof.

In the general formula (1), the aliphatic hydrocarbon group having 6 to 20 carbon atoms and represented by $R^{12}$ is preferably an alkyl group having 6 to 20 carbon atoms or an alkenyl group having 6 to 20 carbon atoms, more preferably an alkyl group having 6 to 20 carbon atoms from the viewpoint of facilitating the exertion of the wear-resistance improving effect.

Examples of the alkyl group having 6 to 20 carbon atoms and represented by $R^{12}$ include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

The alkyl group may be linear or branched. Although the branched structure (the number of branches, and the branch position) included in the branched alkyl group is not particularly limited, the branched alkyl group is preferred from the viewpoint of more remarkably facilitating the exertion of the wear-resistance improving effect.

Further, from the same viewpoint, the number of carbon atoms of the alkyl group is preferably 6 to 16, more preferably 6 to 12.

Examples of the alkenyl group having 6 to 20 carbon atoms and represented by $R^{12}$ include a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an eicosenyl group.

The alkenyl group may be linear or branched. Although the branched structure (the number of branches, and the branch position) included in the branched alkyl group is not particularly limited, the branched alkenyl group is preferred from the viewpoint of more remarkably facilitating the exertion of the wear-resistance improving effect. The position and the number of unsaturated bonds in the linear or branched alkenyl group are not particularly limited Further, from the same viewpoint, the number of carbon atoms of the alkenyl group is preferably 6 to 16, more preferably 6 to 12.

Here, from the viewpoint of more remarkably facilitating the exertion of the wear-resistance improving effect, $R^{12}$ is preferably a branched alkyl group having 6 to 16 carbon atoms, more preferably a branched alkyl group having 6 to 12 carbon atoms, further preferably a 2-ethyl hexyl group or an isodecyl group.

In the general formula (1a), the branched aliphatic hydrocarbon group having 3 to 20 carbon atoms and represented by $R^{13}$ is preferably a branched alkyl group having 3 to 20 carbon atoms or a branched alkenyl group having 3 to 20 carbon atoms, and more preferably a branched alkyl group having 3 to 20 carbon atoms from the viewpoint of facilitating the exertion of the wear-resistance improving effect.

Examples of the branched alkyl group having 3 to 20 carbon atoms and represented by $R^{13}$ include a branched propyl group, a branched butyl group, a branched pentyl group, a branched hexyl group, a branched heptyl group, a branched octyl group, a branched nonyl group, a branched decyl group, a branched undecyl group, a branched dodecyl group, a branched tridecyl group, a branched tetradecyl group, a branched pentadecyl group, a branched hexadecyl group, a branched heptadecyl group, a branched octadecyl group, a branched nonadecyl group, and a branched eicosyl group.

Although the branched structure (the number of branches, and the branch position) included in the alkyl group is not particularly limited, from the viewpoint of more remarkably facilitating the exertion of the wear-resistance improving effect, and from the viewpoint of thermal stability improvement, the number of branches is preferably 1 or more, more preferably 2 or more, further preferably 2. Further, from the same viewpoint, the branch position is preferably carbon (that is, acarbon) adjacent to the phenyl group.

Further, from the same viewpoint, the number of carbon atoms of the alkyl group is preferably 3 or more. Further, it is preferably 10 or less, more preferably 8 or less, further preferably 6 or less. The upper limit values and the lower limit values in these numerical ranges can be arbitrarily combined. Specifically, it is preferably 3 to 10, more preferably 3 to 8, further preferably 3 to 6.

Examples of the branched alkenyl group having 3 to 20 carbon atoms and represented by $R^{13}$ include a branched propenyl group, a branched butenyl group, a branched pentenyl group, a branched hexenyl group, a branched heptenyl group, a branched octenyl group, a branched nonenyl group, a branched decenyl group, a branched undecenyl group, a branched dodecenyl group, a branched tridecenyl group, a branched tetradecenyl group, a branched pentadecenyl group, a branched hexadecenyl group, a branched heptadecenyl group, a branched octadecenyl group, a branched nonadecenyl group, and a branched eicosenyl group.

Although the branched structure (the number of branches, and the branch position) included in the alkenyl group is not particularly limited, from the viewpoint of more remarkably facilitating the exertion of the wear-resistance improving effect, and from the viewpoint of thermal stability improvement, the number of branches is preferably 1 or more, more preferably 2 or more, further preferably 2. From the same viewpoint, the branch position is preferably carbon (that is, acarbon) adjacent to the phenyl group. Further, the position and the number of unsaturated bonds in the alkenyl group are not particularly limited.

Further, from the same viewpoint, the number of carbon atoms of the branched alkenyl group is preferably 3 or more. Further, it is preferably 10 or less, more preferably 8 or less, further preferably 6 or less. The upper limit values and the lower limit values in these numerical ranges may be arbitrarily combined. Specifically, it is preferably 3 to 10, more preferably 3 to 8, further preferably 3 to 6.

Here, from the viewpoint of more remarkably facilitating the exertion of the wear-resistance improving effect, and from the viewpoint of thermal stability improvement, $R^{13}$ is preferably a branched alkyl group having 3 to 8 carbon atoms, more preferably a branched alkyl group having 3 to 6 carbon atoms, further preferably a tert-pentyl group.

In the general formula (1), n is an integer of 1 to 3. In the case of n≥2, $R^{11}$—O—'s may be the same or different from each other. Further, in the case of n=1, —O—$R^{12}$'s may be the same or different from each other.

Here, from the viewpoint of facilitating the exertion of the wear-resistance improving effect, and from the viewpoint of thermal stability improvement, n is preferably an integer of 2 to 3, and n is more preferably 3.

In the general formula (1a), m is an integer of 0 to 5. In the case of m≥2, $R^{13}$'s may be the same or different from each other.

Here, from the viewpoint of more remarkably facilitating the exertion of the wear-resistance improving effect, and from the viewpoint of thermal stability improvement, m is preferably an integer of 1 to 5, m is more preferably an integer of 1 to 4, m is further preferably an integer of 1 to 3, and m is still further preferably an integer of 1 to 2.

In particular, when n in the general formula (1) is 3, by adjusting m to the above range, it is possible to make it easy to more remarkably exert the wear-resistance improving effect.

The position at which $R^{13}$ is bonded to the phenyl group is not particularly limited, but from the same viewpoint, when m=1, it is desirable that $R^{13}$ is bonded to a para position. When m=2, it is desirable that one $R^{13}$ is bonded to a para position, and the other $R^{13}$ is bonded to an ortho position. In the case of m>2, it is desirable that at least one of $R^{13}$'s is bonded to a para position, and at least one of the rest is bonded to an ortho position.

(Second Phosphite Ester (B2))

The second phosphite ester (B2) is a compound represented by the following general formula (2).

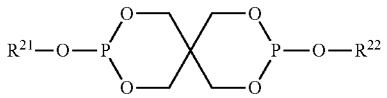

(2)

In the general formula (2), each of $R^{21}$ and $R^{22}$ is independently an aliphatic hydrocarbon group having 10 to 30 carbon atoms.

The second phosphite ester (B2) may be used either alone or in combination of two or more thereof.

In the general formula (1), the aliphatic hydrocarbon group having 10 to 30 carbon atoms and represented by $R^{21}$ and $R^{22}$ is preferably an alkyl group having 10 to 30 carbon atoms, or an alkenyl group having 10 to 30 carbon atoms, and more preferably an alkyl group having 10 to 30 carbon atoms from the viewpoint of more remarkably facilitating the exertion of the wear-resistance improving effect.

Examples of the alkyl group having 10 to 30 carbon atoms and represented by $R^{21}$ and $R^{22}$ include a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, a tetracosyl group, and a triacontyl group.

The alkyl group may be linear or branched. The branched structure (the number of branches, and the branch position) included in the branched alkyl group is not particularly limited.

Here, from the viewpoint of more remarkably facilitating the exertion of the wear-resistance improving effect, the alkyl group is preferably linear.

Further, from the same viewpoint, the number of carbon atoms of the alkyl group is preferably 14 to 24, more preferably 16 to 20.

Examples of the alkenyl group having 10 to 30 carbon atoms and represented by $R^{21}$ and $R^{22}$ include a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an eicosenyl group, a heneicosenyl group, a tetracosenyl group, and a triacontanyl group.

The alkenyl group may be linear or branched. The branched structure (the number of branches, and the branch position) included in the branched alkenyl group is not particularly limited. Further, the position and the number of unsaturated bonds in the linear or branched alkenyl group are not particularly limited.

Here, from the viewpoint of more remarkably facilitating the exertion of the wear-resistance improving effect, the alkenyl group is preferably linear.

Further, from the same viewpoint, the number of carbon atoms of the alkenyl group is preferably 14 to 24, more preferably 16 to 20.

Here, from the viewpoint of more remarkably facilitating the exertion of the wear-resistance improving effect, $R^{21}$ and $R^{22}$ are preferably linear alkyl groups having 14 to 24 carbon atoms, more preferably linear alkyl groups having 16 to 20 carbon atoms, further preferably n-octadecyl groups.

$R^{21}$ and $R^{22}$ may be the same or different from each other, but are preferably the same.

Preferred Embodiment of First Phosphorus Compound (B), and Content of First Phosphorus Compound (B))

The first phosphorus compound (B) is preferably the first phosphite ester (B1) from the viewpoint of more remarkably facilitating the exertion of the wear-resistance improving effect.

Further, in the refrigerator oil composition according to one aspect of the present invention, from the viewpoint of more remarkably facilitating the exertion of the wear-resistance improving effect, the phosphorus atom content ($B_p$) derived from the first phosphorus compound (B) is preferably 30 ppm by mass or more based on the total amount of the refrigerator oil composition, more preferably 35 ppm by mass or more, further preferably 40 ppm by mass or more, still further preferably 45 ppm by mass or more. Further, it is preferably 1,000 ppm by mass or less, more preferably 950 ppm by mass or less, further preferably 900 ppm by mass or less.

The upper limit values and the lower limit values in these numerical ranges can be arbitrarily combined. Specifically, it is preferably 30 ppm by mass to 1,000 ppm by mass, more preferably 35 ppm by mass to 950 ppm by mass, further preferably 40 ppm by mass to 900 ppm by mass, still further preferably 45 ppm by mass to 900 ppm by mass.

In the refrigerator oil composition according to one aspect of the present invention, the content of the first phosphorus compound (B) may be adjusted such that the phosphorus atom content ($B_P$) derived from the first phosphorus compound (B) satisfies the above range. Specifically, the content of the first phosphorus compound (B) is preferably 0.05% by mass to 1% by mass, more preferably 0.1% by mass to 1% by mass, further preferably 0.1% by mass to 0.7% by mass based on the total amount of the refrigerator oil composition.

<Second Phosphorus Compound (C)>

It is desirable that the refrigerator oil composition according to one aspect of the present invention contains the base oil (A) and the first phosphorus compound (B) and at the same time further contains a second phosphorus compound (C).

The second phosphorus compound (C) is at least one selected from the group consisting of a phosphoric acid compound (C1) and an organic phosphine oxide compound (C2).

When the refrigerator oil composition according to one aspect of the present invention contains the second phosphorus compound (C) together with the first phosphorus compound (B), these act synergistically and then the remarkable wear-resistance improving effect of the first phosphorus compound (B) can be further improved.

Hereinafter, the phosphoric acid compound (C1) and the organic phosphine oxide compound (C2) used as the second phosphorus compound (C) will be described in detail.

In the following description, the "second phosphorus compound (C)" is also referred to as a "component (C)." Further, "the phosphoric acid compound (C1)" and the "organic phosphine oxide compound (C2)" are also referred to as a "component (C1)" and a "component (C2)," respectively.

(Phosphoric Acid Compound (C1))

The phosphoric acid compound (C1) is preferably at least one selected from the group consisting of a phosphoric acid ester represented by the following general formula (c-1-i), and an acidic phosphoric acid ester represented by the following general formula (c-1-ii) or the following general formula (c-1-iii).

(c-1-i)

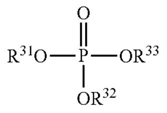

(c-1-ii)

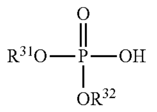

(c-1-iii)

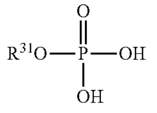

In the general formulas (c-1-i) to $R^{31}$ to $R^{33}$ are alkyl groups having 4 to 30 carbon atoms, alkenyl groups having 4 to 30 carbon atoms, aryl groups having 6 to 30 carbon atoms, alkylaryl groups having 7 to 30 carbon atoms, and arylalkyl groups having 7 to 30 carbon atoms. $R^{31}$ to $R^{33}$ may be the same or different from each other.

Examples of the phosphoric acid ester represented by the general formula (c-1-i) include triphenyl phosphate, tricresyl phosphate, benzylcliphenyl phosphate, ethyldiphenyl phosphate, tributyl phosphate, ethylclibutyl phosphate, cresyldiphenyl phosphate, dicresylphenyl phosphate, ethylphenylcliphenyl phosphate, diethylphenylphenyl phosphate, propylphenylcliphenyl phosphate, dipropylphenylphenyl phosphate, triethylphenyl phosphate, tripropylphenyl phosphate, butylphenyldiphenyl phosphate, dibutylphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

The phosphoric acid ester represented by the general formula (c-1-i) may be used either alone or in combination of two or more thereof.

Examples of the acidic phosphoric acid ester represented by the general formula (c-1-ii) or the general formula (c-1-iii) include 2-ethylhexylacidphosphate, ethylacidphosphate, butylacidphosphate, oleylacidphosphate, tetracosylacidphosphate, isodecylacidphosphate, laurylacidphosphate, tridecylacidphosphate, stearylacidphosphate, and isostearylacidphosphate. The acidic phosphoric acid ester represented by the general formula (c-1-ii) or the general formula (c-1-iii) may be used either alone or in combination of two or more thereof.

Here, from the viewpoint of making it easier to exert the synergistic improving effect of wear resistance through a combination with the first phosphorus compound (B), the phosphoric acid compound (C1) is preferably the phosphoric acid ester represented by the general formula (c-1-i). More preferably, in the phosphoric acid ester represented by the general formula (c-1-i), $R^{31}$ to $R^{33}$ are alkylaryl groups having 7 to 30 carbon atoms (preferably having 7 to 20 carbon atoms, more preferably having 7 to 10 carbon atoms). Further preferably, the phosphoric acid ester represented by the general formula (c-1-i) is tricresyl phosphate.

(Organic Phosphine Oxide Compound (C2))

The organic phosphine oxide compound (C2) may be an organic phosphine oxide compound having one phosphorus atom, or may be an organic phosphine oxide compound having two or more phosphorus atoms.

Examples of the organic phosphine oxide compound having one phosphorus atom include a compound represented by the following general formula (c-2-i), and examples of the organic phosphine oxide compound having two or more phosphorus atoms include a compound represented by the following general formula (c-2-ii).

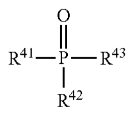

(c-2-i)

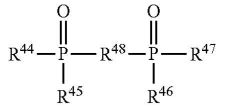

(c-2-ii)

In the formula (c-2-i), each of $R^{44}$ to $R^{43}$ independently represents a substituted or unsubstituted hydrocarbon group having 1 to 20 carbon atoms. In the formula (c-2-ii), each of $R^{44}$ to $R^{47}$ independently represents a substituted or unsubstituted hydrocarbon group having 1 to 20 carbon atoms. $R^{48}$ represents a substituted or unsubstituted divalent hydrocarbon group having 1 to 20 carbon atoms, which may include an ether bond.

Examples of the substituted or unsubstituted hydrocarbon group having 1 to 20 carbon atoms and represented by $R^{41}$ to $R^{43}$ include a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, and a substituted or unsubstituted aryl group having 6 to 20 carbon atoms. Among these, a substituted or unsubstituted alkyl group having 1 to 20 carbon atoms, and a substituted or unsubstituted aryl group having 6 to 20 carbon atoms are preferred, and a substituted or unsubstituted aryl group having 6 to 20 carbon atoms is more preferred.

Examples of a substituent of these hydrocarbon groups include a halogen atom, a hydroxy group, an amino group, an imino group, an amide group, a carboxy group, an alkyl group having 1 to 5 carbon atoms, and an alkoxy group having 1 to 5 carbon atoms.

Examples of the substituted or unsubstituted alkyl group having 1 to 20 carbon atoms and represented by $R^{41}$ to $R^{43}$ include alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; and cycloalkyl groups such as a cyclopentyl group, a cyclohexyl group, various methylcyclohexyl groups, various ethylcyclohexyl groups, various propylcyclohexyl groups, and various dimethylcyclohexyl groups.

The number of carbon atoms of the alkyl group is preferably 2 to 10, more preferably 3 to 8.

Examples of the substituted or unsubstituted aryl group having 6 to 20 carbon atoms and represented by $R^{44}$ to $R^{43}$ include a substituted or unsubstituted phenyl group, and a substituted or unsubstituted naphthyl group. Among these, a substituted or unsubstituted phenyl group is preferred. Examples of the substituted or unsubstituted phenyl group include a phenyl group, various methoxyphenyl groups, various dimethoxyphenyl groups, various trimethoxyphenyl groups, various ethoxyphenyl groups, a 2,6-dimethyl-4-ethoxyphenyl group, various methylphenyl groups, various dimethylphenyl groups, and various trimethylphenyl groups.

Among these, a phenyl group (an unsubstituted phenyl group) is preferred. The number of carbon atoms of such an aryl group is preferably 6 to 10, more preferably 6 to 8.

Examples of the organic phosphine oxide compound represented by the general formula (c-2-i) include triphenyl phosphine oxide, and tri-n-octyl phosphine oxide.

The organic phosphine oxide compound represented by the general formula (c-2-i) may be used either alone or in combination of two or more thereof.

In the general formula (c-2-ii), examples of the substituted or unsubstituted hydrocarbon group having 1 to 20 carbon atoms and represented by $R^{44}$ to $R^{47}$, include the same as the substituted or unsubstituted hydrocarbon groups having 1 to 20 carbon atoms and represented by $R^{41}$ to $R^{43}$ in the general formula (c-2-i), and the same also applies to the preferred embodiment.

In the general formula (c-2-ii), examples of the substituted or unsubstituted divalent hydrocarbon group having 1 to 20 carbon atoms and represented by $R^{48}$, which may include an ether bond, include a substituted or unsubstituted alkylene group having 1 to 20 carbon atoms, a substituted or unsubstituted alkenylene group having 2 to 20 carbon atoms, a substituted or unsubstituted alkynylene group having 2 to 20 carbon atoms, and a substituted or unsubstituted arylene group having 6 to 20 carbon atoms, each of which may include an ether bond. Examples of a substituent of these hydrocarbon groups include the same as those exemplified as the substituent of $R^{41}$ to $R^{43}$.

Examples of the substituted or unsubstituted alkylene group having 1 to 20 carbon atoms, which may include an ether bond, include an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups.

Examples of the substituted or unsubstituted arylene group having 6 to 20 carbon atoms, which may include an ether bond, include various phenylene groups, various methylphenylene groups, various ethylphenylene groups, various dimethylphenylene groups, various naphthylenes, a diphenylene ether group, and a 9,9-dimethylxanthene derived divalent group.

Examples of the organic phosphine oxide compound represented by the general formula (c-2-ii) include bis[2-[(oxo)diphenylphosphino]phenyl]ether.

The organic phosphine oxide compound represented by the general formula (c-2 may be used either alone or in combination of two or more thereof.

Here, from the viewpoint of making it easier to exert the synergistic improving effect of wear resistance through a combination with the first phosphorus compound (B), the organic phosphine oxide compound (C2) is preferably the organic phosphine oxide compound represented by the general formula (c-2-i), and more preferably triphenylphosphine oxide.

Preferred Embodiment of Second Phosphorus Compound (C), and Content of Second Phosphorus Compound (C))

From the viewpoint of more remarkably facilitating the exertion of the wear-resistance improving effect, the second phosphorus compound (C) is preferably the organic phosphine oxide compound (C2).

In the refrigerator oil composition according to one aspect of the present invention, from the viewpoint of making it easier to exert the synergistic improving effect of wear resistance through a combination with the first phosphorus compound (B), the phosphorus atom content (CO derived from the second phosphorus compound (C) is preferably 200 ppm by mass or more, more preferably 300 ppm by mass or more, further preferably 400 ppm by mass or more. Further, it is preferably 1,200 ppm by mass or less, more preferably 1,100 ppm by mass or less, further preferably 1,000 ppm by mass or less.

The upper limit values and the lower limit values in these numerical ranges can be arbitrarily combined. Specifically, it is preferably 200 ppm by mass to 1,200 ppm by mass, more preferably 300 ppm by mass to 1,100 ppm by mass, further preferably 400 ppm by mass to 1,000 ppm by mass.

In the refrigerator oil composition according to one aspect of the present invention, the content of the second phosphorus compound (C) may be adjusted such that the phosphorus atom content ($C_P$) derived from the second phosphorus compound (C) satisfies the above range. Specifically, the content of the second phosphorus compound (C) is preferably 0.1% by mass or more, more preferably 0.2% by mass or more, further preferably 0.3% by mass or more, based on the total amount of the refrigerator oil composition. Further, it is preferably 1.5% by mass or less, more preferably 1.2% by mass or less.

The upper limit values and the lower limit values in these numerical ranges can be arbitrarily combined. Specifically, it is preferably 0.1% by mass to 1.5% by mass, more preferably 0.2% by mass to 1.5% by mass, further preferably 0.3% by mass to 1.2% by mass.

(Total Content of First Phosphorus Compound (B) and Second Phosphorus Compound (C))

In the refrigerator oil composition according to one aspect of the present invention, the total content ($B_P$+$C_P$) of phosphorus atoms derived from the first phosphorus compound (B) and the second phosphorus compound (C) is preferably 200 ppm by mass or more, more preferably 300 ppm by mass or more, further preferably 400 ppm by mass or more from the viewpoint of making it easier to exert the synergistic improving effect of wear resistance through a combination with the first phosphorus compound (B). Further, it is preferably 1,500 ppm by mass or less, more preferably 1,400 ppm by mass or less, further preferably 1,300 ppm by mass or less.

The upper limit values and the lower limit values in these numerical ranges can be arbitrarily combined. Specifically, it is preferably 200 ppm by mass to 1,500 ppm by mass, more preferably 300 ppm by mass to 1,400 ppm by mass, further preferably 400 ppm by mass to 1,300 ppm by mass.

In the refrigerator oil composition according to one aspect of the present invention, the total content of the first phosphorus compound (B) and the second phosphorus compound (C) may be adjusted such that the total content ($B_P$+$C_P$) of phosphorus atoms derived from the first phosphorus compound (B) and the second phosphorus compound (C) satisfies the above range. Specifically, the total content of the first phosphorus compound (B) and the second phosphorus compound (C) is preferably 0.1% by mass or more, more preferably 0.3% by mass or more based on the total amount of the refrigerator oil composition. Further, it is preferably 2.0% by mass or less, more preferably 1.5% by mass or less.

The upper limit values and the lower limit values in these numerical ranges can be arbitrarily combined. Specifically, it is preferably 0.1% by mass to 2.0% by mass, more preferably 0.3% by mass to 2.0% by mass, further preferably 0.3% by mass to 1.5% by mass.

(Content Ratio of First Phosphorus Compound (B) to Second Phosphorus Compound (C))

In the refrigerator oil composition according to one aspect of the present invention, the content ratio [(B)/(C)] of the first phosphorus compound (B) to the second phosphorus compound (C) is preferably 1/12 to 2/1 in terms of mass ratio, more preferably 1/10 to 1.5/1, further preferably 1/9 to 1/1 from the viewpoint of making it easier to exert the synergistic improving effect of wear resistance through a combination with the first phosphorus compound (B).

<Additive>

The refrigerator oil composition according to one aspect of the present invention may further contain an additive within a range where the effect of the present invention is not impaired.

From the viewpoint of the stability improvement of the refrigerator oil composition, it is desirable that as the additive, at least one type selected from the group consisting of an antioxidant, an oiliness improver, an oxygen scavenger, a copper deactivator, a rust inhibitor, a defoaming agent, and a viscosity index improver is contained, and it is more desirable that at least an antioxidant is contained.

Further, the refrigerator oil composition according to one aspect of the present invention may contain an extreme pressure agent corresponding to neither the component (B) nor the component (C).

These additives may be used either alone or in combination of two or more thereof.

The total content of these additives is preferably 0 to 10% by mass, more preferably 0.01 to 5% by mass, further preferably 0.1 to 3% by mass based on the total amount (100% by mass) of the refrigerator oil composition.

(Antioxidant)

The antioxidant is preferably at least one selected from the group consisting of a phenol-based antioxidant and an amine-based antioxidant.

Examples of the phenol-based antioxidant include 2,6-di-tert-butyl-p-cresol (DBPC), 2,6-di-tert-butyl-4-ethylphenol, and 2,2'-methylenebis(4-methyl-6-tert-butylphenol).

Examples of the amine-based antioxidant include phenyl-α-naphthylamine, and N, N'-diphenyl-p-phenylenediamine.

Among these, 2,6-di-tert-butyl-p-cresol (DBPC) is more preferred.

From the viewpoint of the stability and the antioxidant performance, the content of the antioxidant is preferably 0.01 to 5% by mass, more preferably 0.05 to 3% by mass, further preferably 0.1 to 1% by mass based on the total amount of the refrigerator oil composition (100% by mass).

(Oiliness Improver)

Examples of the oiliness improver include: aliphatic saturated or unsaturated monocarboxylic acids such as stearic acid, and oleic acid; polymerized fatty acids such as dimer acid, and hydrogenated dimer acid; hydroxy fatty acids such as ricinoleic acid, and 12-hydroxystearic acid; aliphatic saturated or unsaturated monoalcohols such as laurylalcohol, and oleylalcohol; aliphatic saturated or unsaturated monoamines such as stearylamine, and oleylamine; aliphatic saturated or unsaturated monocarboxylic acid amides such as lauric acid amide, and oleic acid amide; and partial esters of aliphatic saturated or unsaturated monocarboxylic acid with polyhydric alcohols such as glycerin and sorbitol.

(Oxygen Scavenger)

Examples of the oxygen scavenger include aliphatic unsaturated compounds, and terpenes having double bonds.

The aliphatic unsaturated compound is preferably unsaturated hydrocarbon, and specific examples thereof may include olefins; and polyenes such as diene, and triene. The olefin is preferably α-olefins such as 1-tetradecene, 1-hexadecene, and 1-octadecene from the viewpoint of the reactivity with oxygen.

From the viewpoint of the reactivity with oxygen, an aliphatic unsaturated compound other than the above is preferably an unsaturated aliphatic alcohol having a conjugated double bond such as vitamin A represented by a molecular formula $C_{20}H_{30}O$ ((2E, 4E, 6E, 8E)-3,7-dimethyl-9-(2,6,6-trimethylcyclohexen-1-yl)nona-2,4,6,8-tetraene-1-ol).

The terpene having the double bond is preferably terpene-based hydrocarbon having a double bond, and more preferably, α-farnesene ($C_{15}H_{24}$; 3,7,11-trimethyldodeca-1,3,6,10-tetraene) or β-farnesene ($C_{15}H_{24}$: 7,11-dimethyl-3-methylidenedodeca-1,6,10-triene) from the viewpoint of reactivity with oxygen.

(Copper Deactivator)

Examples of the copper deactivator include N-[N,N'-dialkyl (an alkyl group having 3 to 12 carbon atoms) aminomethyl]triazole.

(Rust Inhibitor)

Examples of the rust inhibitor include metal sulfonates, aliphatic amines, organic phosphite esters, organic phosphoric acid esters, organic sulfonic acid metal salts, organic phosphoric acid metal salts, alkenyl succinic acid esters, and polyhydric alcohol esters.

(Defoaming Agent)

Examples of the defoaming agent include silicone-based defoaming agents such as silicone oil, and fluorinated silicone oil.

(Viscosity Index Improver)

Examples of the viscosity index improver include polymetacrylate, polyisobutylene, an ethylene-propylene copolymer, and a styrene-diene hydrogenated copolymer.

(Extreme Pressure Agent Corresponding to Neither Component (B) Nor Component (C))

Examples of the extreme pressure agent corresponding to neither the component (B) nor the component (C) include a metal salt of a carboxylic acid, and a sulfur-based extreme pressure agent. Further, a phosphorus-based extreme pressure agent corresponding to neither the component (B) nor the component (C) may also be exemplified.

Examples of the metal salt of the carboxylic acid include metal salts of carboxylic acids having 3 to 60 (preferably 3 to 30) carbon atoms. Among these, at least one selected from the group consisting of metal salts of fatty acids having 12 to 30 carbon atoms and dicarboxylic acids having 3 to 30 carbon atoms is preferred. The metal constituting the metal salt is preferably an alkali metal or an alkaline earth metal, and more preferably an alkali metal.

Examples of the sulfur-based extreme pressure agent include sulfurized fats and oils, sulfurized fatty acids, sulfurized esters, sulfurized olefins, dihydrocarbylpolysulfides, thiocarbamates, thioterpenes, and dialkylthiodipropionates.

Examples of the phosphorus-based extreme pressure agent corresponding to neither the component (B) nor the component (C) include a phosphite ester not corresponding to the component (B), an acidic phosphite ester, a phosphoric acid ester not corresponding to the component (C), an acidic phosphoric acid ester not corresponding to the component (C), and an organic phosphine oxide compound not corresponding to the component (C).

Examples of the phosphite ester not corresponding to the component (B) include a compound in which n=0 in the general formula (1). Specific examples thereof include trialkyl phosphite such as trioleyl phosphite.

Further, examples of another phosphite ester not corresponding to the component (B) include those in which m is 1 or more and $R^{13}$ is a linear aliphatic hydrocarbon group in the general formula (1a) indicating $R^{11}$ of the general formula (1). Specific examples thereof include trisnonylphenyl phosphite.

Examples of the acidic phosphite ester include arylhydrogenphosphite, and alkylhydrogenphosphite.

Specific examples thereof include monoethylhydrogenphosphite, monon-propylhydrogenphosphite, monon-butylhydrogenphosphite, mono2-ethylhexylhydrogenphosphite, monophenylhydrogenphosphite, dihexylhydrogenphosphite, diheptylhydrogenphosphite, din-octylhydrogenphosphite, di2-ethylhexylhydrogenphosphite, and diphenylhydrogenphosphite.

Examples of the phosphorus-based extreme pressure agent (the phosphoric acid ester) not corresponding to the component (C) include tetraphenyl-m-phenylenebisphosphate.

Here, in the refrigerator oil composition of the present invention, the component (B) exerts the effect as an extreme pressure agent. Further, in the refrigerator oil composition according to one aspect of the present invention, the components (B) and (C) exert the effect as an extreme pressure agent. Therefore, the refrigerator oil composition according to one aspect of the present invention may not contain the extreme pressure agent not corresponding to the components (B) and (C).

When the refrigerator oil composition of the present invention contains the extreme pressure agent not corresponding to the components (B) and (C), from the viewpoint of the lubricity and stability (the thermal stability improvement), the content is preferably 0.1% by mass or less based on the total amount of the refrigerator oil composition (100% by mass), more preferably 0.05% by mass or less, further preferably 0.01% by mass or less. It is most preferable that the extreme pressure agent not corresponding to the components (B) and (C) is not contained.

Examples of the extreme pressure agent not corresponding to the components (B) and (C) include the already mentioned compounds, and in particular, at least one selected from trisnonylphenyl phosphite and tetraphenyl-m-phenylenebisphosphate may be exemplified.

[Method of Producing Refrigerator Oil Composition of the Present Invention]

The method of producing the refrigerator oil composition of the present invention is not particularly limited.

For example, the method of producing the refrigerator oil composition according to one aspect of the present invention includes a step of mixing a base oil (A), with a first phosphorus compound (B).

In the method of producing the refrigerator oil composition, the first phosphorus compound (B) is at least one selected from the group consisting of a first phosphite ester (B1) represented by the following general formula (1) and a second phosphite ester (B2) represented by the following general formula (2).

$$\left(R^{11}-O\right)_{n}P\left(O-R^{12}\right)_{3-n} \quad (1)$$

[In the general formula (1), $R^{11}$ is an aromatic group represented by the following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

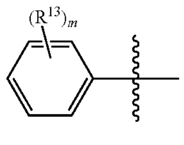

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

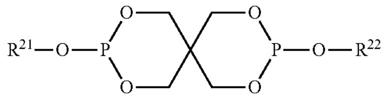

[In the general formula (2), each of $R^{21}$ and $R^{22}$ is independently an aliphatic hydrocarbon group having 10 to 30 carbon atoms.]

The method of mixing the individual components is not particularly limited, but for example, a method including a step of blending the base oil (A) with the first phosphorus compound (B) may be exemplified. Components other than the first phosphorus compound (B) may be blended with the base oil (A) at the same time, or may be blended separately. Each component may be blended after being formed into a solution (dispersion) through addition of diluting oil or the like. It is desirable that, after blended, the individual components are stirred and uniformly dispersed through a conventionally known method.

[Physical Properties of Refrigerator Oil Composition of the Present Invention]

<Phosphorus Atom Content>

In the refrigerator oil composition according to one aspect of the present invention, the phosphorus atom content is preferably 200 ppm by mass or more, more preferably 300 ppm by mass or more, further preferably 400 ppm by mass or more based on the total amount of the refrigerator oil composition. Further, it is preferably 1,500 ppm by mass or less, more preferably 1,400 ppm by mass or less, further preferably 1,300 ppm by mass or less.

The upper limit values and the lower limit values in these numerical ranges can be arbitrarily combined. Specifically, it is preferably 200 ppm by mass to 1,500 ppm by mass, more preferably 300 ppm by mass to 1,400 ppm by mass, further preferably 400 ppm by mass to 1,300 ppm by mass.

The phosphorus atom content can be measured in accordance with ASTM D4951.

<Thermal Stability>

In the refrigerator oil composition according to one aspect of the present invention, the acid value measured by the method described in Examples to be described below is preferably 0.50 mgKOH/g or less, more preferably 0.45 mgKOH/g or less, further preferably 0.40 mgKOH/g or less.

[Refrigerator Mixture Composition]

The refrigerator oil composition of the present invention is mixed with a refrigerant, and is used as a refrigerator mixture composition.

That is, the refrigerator mixture composition of the present invention contains the refrigerator oil composition of the present invention, and the refrigerant.

As the size of a refrigerator is reduced in recent years, the amount of the refrigerator oil composition used within the equipment is being decreased. Meanwhile, as operation conditions become harsh, due to frictional heat, etc. in a sliding portion of a compressor, a place where the temperature becomes high may locally occur in the refrigerator. The refrigerator mixture composition of the present invention, which contains the refrigerator oil composition of the present invention and the refrigerant, exerts an excellent wear resistance even under such a harsh environment.

<Refrigerant>

Examples of the refrigerant include fluorinated hydrocarbon refrigerants such as an unsaturated fluorinated hydrocarbon compound, and a saturated fluorinated hydrocarbon compound; and natural refrigerants such as hydrocarbon, carbon dioxide, and ammonia. These may be used either alone or in combination of two or more thereof. Among these, the refrigerant is preferably at least one selected from the group consisting of an unsaturated fluorinated hydrocarbon compound, a saturated fluorinated hydrocarbon compound, hydrocarbon, carbon dioxide and ammonia, and more preferably an unsaturated fluorinated hydrocarbon compound.

Hereinafter, each refrigerant will be described.

<Unsaturated Fluorinated Hydrocarbon Compound>

Examples of the unsaturated fluorinated hydrocarbon compound include those having carbon-carbon double bonds, such as fluorides of linear or branched olefin having 2 to 6 carbon atoms and cyclic olefin having 4 to 6 carbon atoms.

More specific examples thereof include ethylene into which 1 to 3 fluorine atoms are introduced, propene into which 1 to 5 fluorine atoms are introduced, butene into which 1 to 7 fluorine atoms are introduced, pentene into which 1 to 9 fluorine atoms are introduced, hexene into which 1 to 11 fluorine atoms are introduced, cyclobutene into which 1 to 5 fluorine atoms are introduced, cyclopentene into which 1 to 7 fluorine atoms are introduced, and cyclohexene into which 1 to 9 fluorine atoms are introduced.

Among these unsaturated fluorinated hydrocarbon compounds, a fluoride of propene is preferred, propene into which 3 to 5 fluorine atoms are introduced is more preferred, and propene into which 4 fluorine atoms are introduced is further preferred. Specifically, 1,3,3,3-tetrafluoropropene (R1234ze), 2,3,3,3-tetrafluoropropene (R1234yf) and the like may be exemplified as preferable compounds.

Such an unsaturated fluorinated hydrocarbon compound may be used either alone or in combination of two or more thereof, and this may be used in combination with a refrigerant other than the unsaturated fluorinated hydrocarbon compound. Here, as an example of a case of use through a combination with a refrigerant other than the unsaturated fluorinated hydrocarbon compound, a mixed refrigerant of a saturated fluorinated hydrocarbon compound and an unsaturated fluorinated hydrocarbon compound may be exemplified. Examples of the mixed refrigerant include a mixed refrigerant of R32 and R1234yf, and a mixed refrigerant of R32, R1234ze, and R152a (AC5, a mixing ratio of 13.23:76.20:9.96).

<Saturated Fluorinated Hydrocarbon Compound>

The saturated fluorinated hydrocarbon compound is preferably a fluoride of alkane having 1 to 4 carbon atoms, more preferably a fluoride of alkane having 1 to 3 carbon atoms, further preferably a fluoride of alkane (methane or ethane) having 1 or 2 carbon atoms. Examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125). Among these, difluoromethane and 1,1,1,2,2-pentafluoroethane are preferred.

Such a saturated fluorinated hydrocarbon compound may be used either alone or two or more thereof. Here, as an example of a case where two or more types are used in combination, a mixed refrigerant in which two or more types of saturated fluorinated hydrocarbon compounds having 1 to 3 carbon atoms are mixed, and a mixed refrigerant in which two or more types of saturated fluorinated hydrocarbon compounds having 1 to 2 carbon atoms are mixed may be exemplified.

Examples of the mixed refrigerant include a mixture of R32 and R125 (R410A), a mixture of R125, R143a, and R134a (R404A), a mixture of R32, R125, and R134a (R407A, R407C, R407E, etc.), and a mixture of R125 and R143a (R507A).

<Natural Refrigerant>

As the natural refrigerant, at least one selected from the group consisting of a hydrocarbon (HC)-based refrigerant, carbon dioxide (CO2), and ammonia may be exemplified, and a hydrocarbon (HC)-based refrigerant is preferred. These may be used either alone or in combination of two or more thereof, and may be used in combination with a refrigerant other than the natural refrigerant. Here, as an example of a case of use through a combination with a refrigerant other than the natural refrigerant, a mixed refrigerant with a saturated fluorinated hydrocarbon compound and/or an unsaturated fluorinated hydrocarbon compound may be exemplified. Specific examples of the mixed refrigerant include a mixed refrigerant of carbon dioxide, R1234ze, and R134a (AC6, a blending ratio of 5.15:79.02:15.41).

As the hydrocarbon (HC)-based refrigerant, hydrocarbon having 1 to 8 carbon atoms is preferred, hydrocarbon having 1 to 5 carbon atoms is more preferred, hydrocarbon having 3 to 5 carbon atoms is further preferred. one having 8 or less carbon atoms is preferable as a refrigerant because the boiling point of the refrigerant does not become too high. Examples of the hydrocarbon-based refrigerant include methane, ethane, ethylene, propane (R290), cyclopropane, propylene, n-butane, isobutane (R600a), 2-methylbutane, n-pentane, isopentane, cyclopentane isobutane, and normal butane.

The hydrocarbon-based refrigerant may be used either alone or in combination of two or more thereof. Further, the hydrocarbon-based refrigerant may be used alone as the hydrocarbon-based refrigerant, or may be used as a mixed refrigerant obtained through mixing with a fluorinated hydrocarbon refrigerant such as R134a, or with a refrigerant other than the hydrocarbon-based refrigerant such as carbon dioxide.

In the refrigerator mixture composition according to one aspect of the present invention, the use amount of the refrigerant and the refrigerator oil composition is preferably 1/99 to 90/10, more preferably 5/95 to 70/30 in terms of the mass ratio of the refrigerator oil composition/the refrigerant. When the mass ratio of the refrigerator oil composition/the refrigerant falls within the range, a lubricity and a refrigerating capacity suitable for a refrigerator can be obtained.

Here, from the viewpoint of using a refrigerant having a low global warming potential, it is desirable that the refrigerant contains the unsaturated fluorinated hydrocarbon compound.

Further, the content of the unsaturated fluorinated hydrocarbon compound in the refrigerant is preferably 50% by mass or more, more preferably 70% by mass or more, further preferably 90% by mass or more based on the total amount (100% by mass) of the refrigerant. The refrigerant is still further preferably a refrigerant composed of only the unsaturated fluorinated hydrocarbon compound.

[Physical Properties of Refrigerator Mixture Composition of the Present Invention]

<Wear Resistance>

In the refrigerator mixture composition according to one aspect of the present invention, the wear amount measured by the method described in Examples to be described below is preferably 5.0 mg or less, more preferably 4.0 mg or less, further preferably 3.0 mg or less, still further preferably 2.5 mg or less, still further preferably 2.0 mg or less.

[Use of Refrigerator Oil Composition and Refrigerator Mixture Composition of the Present Invention]

It is preferable that the refrigerator oil composition and the refrigerator mixture composition of the present invention are used for, for example, air conditioning systems, refrigerators, vending machines, display cases, freezing systems, hot water supply systems, or heating systems. Examples of the air conditioning system include car air conditioners such as an open-type car air conditioner, and an electric car air conditioner; and gas heat pump (GHP) air conditioners.

[One Aspect of the Present Invention Provided]

In one aspect of the present invention, the followings [1] to [8] are provided. [1] A refrigerator oil composition containing a base oil (A), and a first phosphorus compound (B), in which the first phosphorus compound (B) is at least one selected from the group consisting of a first phosphite ester (B1) represented by a following general formula (1) and a second phosphite ester (B2) represented by a following general formula (2).

$$(R^{11}-O)_n P(O-R^{12})_{3-n} \quad (1)$$

[In the general formula (1), $R^{11}$ is an aromatic group represented by a following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

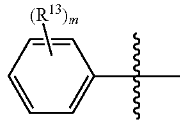

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

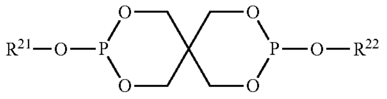

[In the general formula (2), each of $R^{21}$ and $R^{22}$ is independently an aliphatic hydrocarbon group having 10 to 30 carbon atoms.]

[2] The refrigerator oil composition described in [1], in which m in the general formula (1a) is an integer of 1 to 5.

[3] The refrigerator oil composition described in [1] or [2], further containing a second phosphorus compound (C), in which the second phosphorus compound (C) is at least one selected from the group consisting of a phosphoric acid compound (C1) and an organic phosphine oxide compound (C2).

[4] The refrigerator oil composition described in any one of [1] to [3], in which a phosphorus atom content is 200 ppm by mass to 1,500 ppm by mass based on a total amount of the refrigerator oil composition.

[5] The refrigerator oil composition described in any one of [1] to [4], in which the base oil (A) contains at least one type selected from the group consisting of polyalkyleneglycols, polyvinylethers, a copolymer of poly(oxy)alkyleneglycol or its monoether and polyvinylether, polyolesters, and mineral oil.

[6] A method of producing a refrigerator oil composition, the method including a step of mixing a base oil (A) with a first phosphorus compound (B), in which the first phosphorus compound (B) is at least one selected from the group consisting of a first phosphite ester (B1) represented by a following general formula (1) and a second phosphite ester (B2) represented by a following general formula (2).

$$(R^{11}-O)_n P(O-R^{12})_{3-n} \quad (1)$$

[In the general formula (1), $R^{11}$ is an aromatic group represented by a following general formula (1a). $R^{12}$ is an aliphatic hydrocarbon group having 6 to 20 carbon atoms. n is an integer of 1 to 3. In the case of n≥2, $R^{11}$—O—'s may be the same or different from each other. Further, in the case of n=1, —O—$R^{12}$'s may be the same or different from each other.]

(1a)

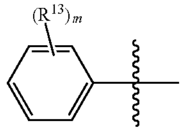

[In the general formula (1a), $R^{13}$ is a branched aliphatic hydrocarbon group having 3 to 20 carbon atoms. m is an integer of 0 to 5. In the case of m≥2, $R^{13}$'s may be the same or different from each other. The wavy line represents a position of bonding to an oxygen atom in $R^{11}$—O—.]

(2)

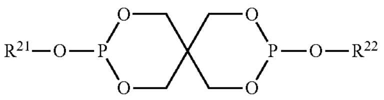

[In the general formula (2), each of $R^{21}$ and $R^{22}$ is independently an aliphatic hydrocarbon group having 10 to 30 carbon atoms.]

[7] A refrigerator mixture composition containing the refrigerator oil composition described in any one of [1] to [5], and a refrigerant.

[8] The refrigerator mixture composition described in [7], in which the refrigerant contains at least one selected from the group consisting of an unsaturated fluorinated hydrocarbon compound, a saturated fluorinated hydrocarbon compound, hydrocarbon, carbon dioxide, and ammonia.

EXAMPLES

The present invention will be described in detail with reference to the following Examples. However, the present invention is not limited to the following Examples.

<Properties of Base Oil (A)>

The 40° C. kinematic viscosity of a base oil (A) used in each of Examples and each of Comparative Examples was measured in accordance with JIS K 2283:2000.

<Details of Each Component Used for Preparing Refrigerator Oil Composition≥

The details of each component used for preparing a refrigerator oil composition are illustrated below.

1. Base Oil (A)

(1) PAG polyoxypropyleneglycol monomethylether, 40° C. kinematic viscosity: 49 $mm^2/s$ (2) PVE copolymer of polyethyl vinylether and polyisobutyl vinylether (structural unit of ethyl vinylether: structural unit of polyisobutyl vinylether =9:1 (molar ratio)), 40° C. kinematic viscosity: 67 $mm^2/s$ 2. First Phosphorus Compound (B)

(1) First Phosphite Ester (B1)-1

Isodecyldiphenyl phosphite (manufactured by JOHOKU CHEMICAL Co., Ltd., JPM-311, a compound represented by the following formula (1-1), phosphorus atom content: 8.1% by mass)

(1-1)

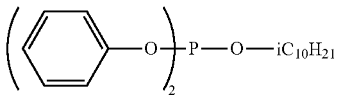

The compound represented by the formula (1-1) corresponds to a compound in which n=2, two $R^{11}$—O—'s are the same, and $R^{12}$ is an isodecyl group in the general formula (1). Further, in the general formula (1a), m=0.

In the formula (1-1), "$-iC_{10}H_{21}$" means an isodecyl group. The same also applies to the following description.

(2) First Phosphite Ester (B1)-2

2-ethylhexyldiphenyl phosphite (manufactured by JOHOKU CHEMICAL Co., Ltd., JPM-308, a compound represented by the following formula (1-2), phosphorus atom content: 8.6% by mass)

(1-2)

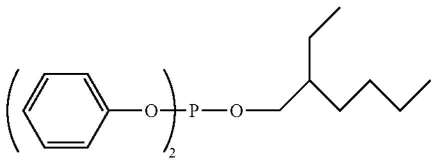

The compound represented by the formula (1-2) corresponds to a compound in which n=2, two $R^{11}$—O—'s are the same, and $R^{12}$ is a 2-ethylhexyl group in the general formula (1). Further, in the general formula (1a), m=0.

(3) First Phosphite Ester (B1)-3

Phenyldiisodecyl phosphite (manufactured by Sakai Chemical Industry Co., Ltd., ChelexD, a compound represented by the following formula (1-3), phosphorus atom content: 7.1% by mass)

(1-3)

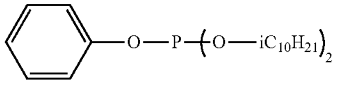

The compound represented by the formula (1-3) corresponds to a compound in which n=1, two —O—$R^{12}$'s are the same, and $R^{12}$ is an isodecyl group in the general formula (1). Further, in the general formula (1a), m=0.

(4) First Phosphite Ester (B1)-4

A reaction product of bis[2,4-bis(2-methylbutane-2-yl)phenyl]4-(2-methylbutane-2-yl)phenyl phosphite, 2,4-bis(2-methylbutane-2-yl)phenylbis[4-(2-methylbutane-2-yl)phenyl]phosphite, and tris[4-(2-methylbutane yl)phenyl]phosphite (manufactured by Addivant, WESTON (registered trademark) 705, a mixture of compounds represented by the following formula (1-4) to the following formula (1-7), phosphorus atom content: 4.9% by mass)

(1-4)

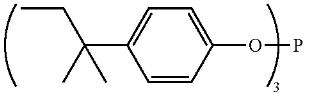

The compound represented by the formula (1-4) corresponds to a compound in which n=3, and three $R^{11}$—O—'s are the same in the general formula (1). Further, in the general formula (1a), m=1, and $R^{13}$ is a tert-pentyl group (a position of bonding to a phenyl group: a para position).

(1-5)

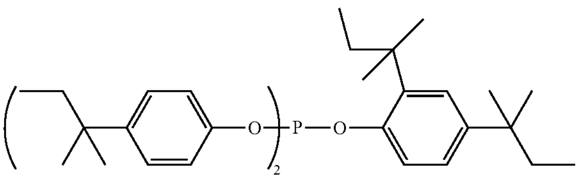

The compound represented by the formula (1-5) corresponds to a compound in which n=3, and among three $R^{11}$—O—'s, two are the same, and one is different in the general formula (1). Further, in the same two $R^{11}$—O—'s, in $R^{11}$ represented by the general formula (1a), m=1, and $R^{13}$ is a tert-pentyl group (a position of bonding to a phenyl group: a para position). In the remaining one $R^{11}$—O—, in $R^{11}$ represented by the general formula (1a), m=2, and $R^{13}$ is a tert-pentyl group (a position of bonding to a phenyl group: an ortho position and a para position).

(1-6)

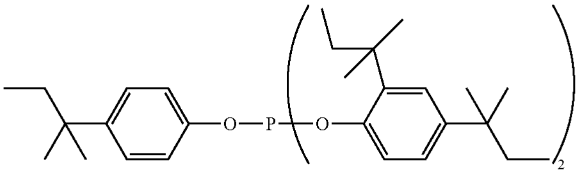

The compound represented by the formula (1-6) corresponds to a compound in which n=3, and among three $R^{11}$—O—'s, two are the same and one is different in the general formula (1). Further, in the same two $R^{11}$—O—'s, in $R^{11}$ represented by the general formula (1a), m=2, and $R^{13}$ is a tert-pentyl group (a position of bonding to a phenyl group: an ortho position and a para position). In the remaining one $R^{11}$—O—, in RH represented by the general formula (1a), m=1, and $R^{13}$ is a tert-pentyl group (a position of bonding to a phenyl group: a para position).

(1-7)

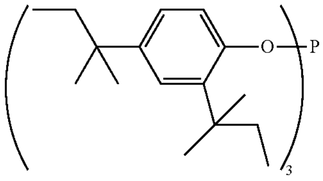

The compound represented by the formula (1-7) corresponds to a compound in which n=3, and three $R^{11}$—O—'s are the same in the general formula (1). Further, in the general formula (1a), m=2, and $R^{13}$ is a tert-pentyl group (a position of bonding to a phenyl group: an ortho position and a para position).

(5) Second Phosphite Ester (B2)-1

Distearylpentaerythritol diphosphite (manufactured by JOHOKU CHEMICAL Co., Ltd., JPP-2000PT, a compound represented by the following formula (2-1), phosphorus atom content: 4.2% by mass)

(2-1)

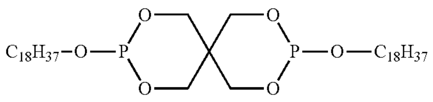

The compound represented by the formula (2-1) corresponds to a compound in which $R^{21}$ and $R^{22}$ are stearyl groups (n-octadecyl groups) in the general formula (2).

3. Phosphite Ester (B'): Comparative Example Compound (1) Phosphite Ester (a)-1

Trioleyl phosphite (manufactured by JOHOKU CHEMICAL Co., Ltd., JP-318-O, a compound represented by the following formula (3-1), phosphorus atom content: 3.7% by mass)

The phosphite ester (B')-1 is a phosphite ester in which n=0 in the general formula (1), and is a phosphite ester not belonging to the first phosphorus compound (B).

(3-1)

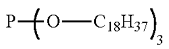

(2) Phosphite Ester (B')-2

Trisnonylphenyl phosphite (manufactured by Sakai Chemical Industry Co., Ltd., TNPP, a compound represented by the following formula (3-2), phosphorus atom content: 4.1% by mass)

The phosphite ester (B')-2 is a phosphite ester in which $R^{13}$ is a linear alkyl group in the general formula (1a), and is a phosphite ester not belonging to the first phosphorus compound (B).

(3-2)

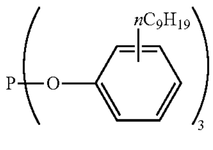

In the formula (3-2), "—$nC_9H_{19}$" means a normal nonyl group.

4. Second Phosphorus Compound (C)

(1) Phosphoric Acid Compound (C1)

Tricresyl phosphate (phosphorus atom content: 8.4% by mass)

(2) Organic Phosphine Oxide Compound (C2)

Triphenyl phosphine oxide (phosphorus atom content: 10.9% by mass)

5. Phosphorus Compound Belonging to Neither First Phosphorus Compound (B) Nor Second Phosphorus Compound (C)

Tetraphenyl-m-phenylenebisphosphate

6. Antioxidant

Di-tert-butyl-p-cresol (DBPC)

Examples 1 to 29 and Comparative Examples 1 to 12

Refrigerator oil compositions having compositions noted in Table 1 to Table 4 were prepared, and the wear resistance was evaluated by the Falex wear test described below. The evaluation results are noted in Table 1 to Table 4. In the blending compositions in Table 1 to Table 4, the numerical value unit is "% by mass." Further, in Table 1 to Table 4, the compound name of the first phosphite ester (B1)-4 is described as "triphenyl phosphite having three phenyl groups, which is substituted with branched alkyl groups."

Further, the P atom content derived from the first phosphorus compound (B), the P atom content derived from the phosphite ester (B'), and the P atom content derived from the second phosphorus compound (C), which are noted in Table 1 to Table 4, were calculated from P atom contents of raw materials, respectively.

<Falex Wear Test>

The following items were prepared as a pin and a block.

Pin: SAE-3135

Block AISI-1137

The following test was performed by using a Falex tester in accordance with ASTM D2670.

The pin and the block were set in the Falex tester, 300 g of the refrigerator oil composition as an evaluation target was put into a test container while 30 g of R1234yf was filled as a refrigerant. Then, the test container was sealed. Then, after a rotation speed of 0.09 m/s, an oil temperature of 60° C., and a load of 1,779 N were set, an operation was carried out for 60 min, and then the total wear amount (mg) of the pin and the block was measured.

This Falex test is a Falex test under harsher conditions than before because the oil temperature and the load are higher than usual.

The evaluation criteria were as follows. The smaller the wear amount (mg), the better the wear resistance.

Evaluation S (pass): 2.0 mg or less

Evaluation A (pass): greater than 2.0 mg and 2.5 mg or less

Evaluation B (pass): greater than 2.5 mg and less than 5.0 mg

Evaluation C (failure): 5.0 mg or more

TABLE 1

| | | | Unit | Example 1 | 2 | 3 | 4 | 5 | 6 |
|---|---|---|---|---|---|---|---|---|---|
| Base oil (A) | | PAG | % by mass | 98.5 | 98.3 | 98.5 | 98.3 | 98.5 | 98.7 |
| | | PVE | % by mass | — | — | — | — | — | — |
| First phosphorus compound (B) | First phosphite ester (B1)-1 | Isodecyldiphenyl phosphite | % by mass | 0.3 | 0.5 | — | — | — | — |
| | First phosphite ester (B1)-2 | 2-ethylhexyldiphenyl phosphite | % by mass | — | — | 0.3 | 0.5 | — | — |
| | First phosphite ester (B1)-3 | Phenyldiisodecyl phosphite | % by mass | — | — | — | — | 0.3 | — |
| | First phosphite ester (B1)-4 | Triphenyl phosphite having three phenyl groups, which is substituted with branched alkyl groups | % by mass | — | — | — | — | — | 0.1 |
| | Second phosphite ester (B2)-1 | Distearyl pentaerythritol diphosphite | % by mass | — | — | — | — | — | — |
| Phosphite ester (B') | Phosphite ester (B')-1 | Trioleyl phosphite | % by mass | — | — | — | — | — | — |
| | Phosphite ester (B')-2 | Trisnonylphenyl phosphite | % by mass | — | — | — | — | — | — |
| Second phosphorus compound (C) | Phosphoric acid compound (C1) | Tricresyl phosphate | % by mass | 0.9 | 0.9 | 0.9 | 0.9 | 0.9 | 0.9 |
| | Organic phosphineoxide compound (C2) | Triphenylphosphine oxide | % by mass | — | — | — | — | — | — |
| Compound corresponding to neither First phosphorus compound (B) nor Second phosphorus compound (C) | | Tetraphenyl-m-phenylenebis phosphate | % by mass | — | — | — | — | — | — |
| Antioxidant | | DBPC | % by mass | 0.3 | 0.3 | 0.3 | 0.3 | 0.3 | 0.3 |
| Properties of refrigerator oil composition | First phosphorus compound (B) -derived P atom content | | ppm by mass | 242 | 404 | 259 | 431 | 213 | 49 |
| | Phosphite ester (B') -derived P atom content | | ppm by mass | 0 | 0 | 0 | 0 | 0 | 0 |
| | Second phosphorus compound (C) -derived P atom content | | ppm by mass | 756 | 756 | 756 | 756 | 756 | 756 |
| | Compound corresponding to neither First phosphorus compound (B) nor Second phosphorus compound (C) -derived P atom content | | ppm by mass | 0 | 0 | 0 | 0 | 0 | 0 |
| | Total content of P atoms | | ppm by mass | 998 | 1160 | 1015 | 1187 | 969 | 805 |
| Evaluation result) | Wear amount in FALEX wear test | | mg | 4.6 | 2.7 | 3.6 | 2.5 | 3.2 | 2.4 |
| | Evaluation | | | B | B | B | A | B | A |

| | | | Unit | Example 7 | 8 | 9 | 10 | 11 | 12 |
|---|---|---|---|---|---|---|---|---|---|
| Base oil (A) | | PAG | % by mass | 98.5 | 98.3 | 99.1 | 98.9 | 98.7 | 98.5 |
| | | PVE | % by mass | — | — | — | — | — | — |
| First phosphorus compound (B) | First phosphite ester (B1)-1 | Isodecyldiphenyl phosphite | % by mass | — | — | — | — | — | — |
| | First phosphite ester (B1)-2 | 2-ethylhexyldiphenyl phosphite | % by mass | — | — | — | — | — | — |
| | First phosphite ester (B1)-3 | Phenyldiisodecyl phosphite | % by mass | — | — | — | — | — | — |
| | First phosphite ester (B1)-4 | Triphenyl phosphite having three phenyl groups, which is substituted with branched alkyl groups | % by mass | 0.3 | 0.5 | 0.1 | 0.3 | 0.5 | — |
| | Second phosphite ester (B2)-1 | Distearyl pentaerythritol diphosphite | % by mass | — | — | — | — | — | 0.3 |
| Phosphite ester (B') | Phosphite ester (B')-1 | Trioleyl phosphite | % by mass | — | — | — | — | — | — |
| | Phosphite ester (B')-2 | Trisnonylphenyl phosphite | % by mass | — | — | — | — | — | — |

TABLE 1-continued

| | | | | | | | | | |
|---|---|---|---|---|---|---|---|---|---|
| Second phosphorus compound (C) | Phosphoric acid compound (C1) | Tricresyl phosphate | % by mass | 0.9 | 0.9 | 0.5 | 0.5 | 0.5 | 0.9 |
| | Organic phosphineoxide compound (C2) | Triphenylphosphine oxide | % by mass | — | — | — | — | — | — |
| Compound corresponding to neither First phosphorus compound (B) nor Second phosphorus compound (C) | | Tetraphenyl-m-phenylenebis phosphate | % by mass | — | — | — | — | — | — |
| Antioxidant | | DBPC | % by mass | 0.3 | 0.3 | 0.3 | 0.3 | 0.3 | 0.3 |
| Properties of refrigerator oil composition | First phosphorus compound (B) -derived P atom content | | ppm by mass | 146 | 244 | 49 | 146 | 244 | 126 |
| | Phosphite ester (B') -derived P atom content | | ppm by mass | 0 | 0 | 0 | 0 | 0 | 0 |
| | Second phosphorus compound (C) -derived P atom content | | ppm by mass | 756 | 756 | 420 | 420 | 420 | 756 |
| | Compound corresponding to neither First phosphorus compound (B) nor Second phosphorus compound (C) -derived P atom content | | ppm by mass | 0 | 0 | 0 | 0 | 0 | 0 |
| | Total content of P atoms | | ppm by mass | 902 | 1000 | 469 | 566 | 664 | 882 |
| Evaluation result) | Wear amount in FALEX wear test | | mg | 1.3 | 0.8 | 2.5 | 1.9 | 1.6 | 2.4 |
| | Evaluation | | | S | S | A | S | S | A |

TABLE 2

| | | | Unit | Example 13 | Example 14 | Example 15 | Example 16 | Example 17 |
|---|---|---|---|---|---|---|---|---|
| Base oil (A) | | PAG | % by mass | 98.7 | 98.5 | 98.3 | 98.7 | 98.7 |
| | | PVE | % by mass | — | — | — | — | — |
| First phosphorus compound (B) | First phosphite ester (B1)-1 | Isodecyldiphenyl phosphite | % by mass | — | — | — | 1.0 | — |
| | First phosphite ester (B1)-2 | 2-ethylhexyldiphenyl phosphite | % by mass | — | — | — | — | 1.0 |
| | First phosphite ester (B1)-3 | Phenyldiisodecyl phosphite | % by mass | — | — | — | — | — |
| | First phosphite ester (B1)-4 | Triphenyl phosphite having three phenyl groups, which is substituted with branched alkyl groups | % by mass | 0.1 | 0.3 | 0.5 | — | — |
| | Second phosphite ester (B2)-1 | Distearyl pentaerythritol diphosphite | % by mass | — | — | — | — | — |
| Phosphite ester (B') | Phosphite ester (B')-1 | Trioleyl phosphite | % by mass | — | — | — | — | — |
| | Phosphite ester (B')-2 | Trisnonylphenyl phosphite | % by mass | — | — | — | — | — |
| Second phosphorus compound (C) | Phosphoric acid compound (C1) | Tricresyl phosphate | % by mass | — | — | — | — | — |
| | Organic phosphineoxide compound (C2) | Triphenylphosphine oxide | % by mass | 0.9 | 0.9 | 0.9 | — | — |
| Compound corresponding to neither First phosphorus compound (B) nor Second phosphorus compound (C) | | Tetraphenyl-m-phenylenebis phosphate | % by mass | — | — | — | — | — |
| Antioxidant | | DBPC | % by mass | 0.3 | 0.3 | 0.3 | 0.3 | 0.3 |
| Properties of refrigerator oil composition | First phosphorus compound (B) -derived P atom content | | ppm by mass | 49 | 146 | 244 | 807 | 862 |
| | Phosphite ester (B') -derived P atom content | | ppm by mass | 0 | 0 | 0 | 0 | 0 |
| | Second phosphorus compound (C) -derived P atom content | | ppm by mass | 981 | 981 | 981 | 0 | 0 |
| | Compound corresponding to neither First phosphorus compound (B) nor Second phosphorus compound (C) -derived P atom content | | ppm by mass | 0 | 0 | 0 | 0 | 0 |
| | Total content of P atoms | | ppm by mass | 1030 | 1127 | 1225 | 807 | 862 |
| Evaluation result | Wear amount in FALEX wear test | | mg | 1.1 | 0.9 | 0.8 | 2.8 | 2.6 |
| | Evaluation | | — | S | S | S | B | B |

TABLE 2-continued

| | | | Unit | Example 18 | Example 19 | Example 20 | Example 21 |
|---|---|---|---|---|---|---|---|
| Base oil (A) | | PAG | % by mass | 98.7 | 99.2 | 98.7 | 98.7 |
| | | PVE | % by mass | — | — | — | — |
| First phosphorus compound (B) | First phosphite ester (B1)-1 | Isodecyldiphenyl phosphite | % by mass | — | — | — | — |
| | First phosphite ester (B1)-2 | 2-ethylhexyldiphenyl phosphite | % by mass | — | — | — | — |
| | First phosphite ester (B1)-3 | Phenyldiisodecyl phosphite | % by mass | 1.0 | — | — | — |
| | First phosphite ester (B1)-4 | Triphenyl phosphite having three phenyl groups, which is substituted with branched alkyl groups | % by mass | — | 0.5 | 1.0 | — |
| | Second phosphite ester (B2)-1 | Distearyl pentaerythritol diphosphite | % by mass | — | — | — | 1.0 |
| Phosphite ester (B') | Phosphite ester (B')-1 | Trioleyl phosphite | % by mass | — | — | — | — |
| | Phosphite ester (B')-2 | Trisnonylphenyl phosphite | % by mass | — | — | — | — |
| Second phosphorus compound (C) | Phosphoric acid compound (C1) | Tricresyl phosphate | % by mass | — | — | — | — |
| | Organic phosphineoxide compound (C2) | Triphenylphosphine oxide | % by mass | — | — | — | — |
| Compound corresponding to neither First phosphorus compound (B) nor Second phosphorus compound (C) | | Tetraphenyl-m-phenylenebis phosphate | % by mass | — | — | — | — |
| Antioxidant | | DBPC | % by mass | 0.3 | 0.3 | 0.3 | 0.3 |
| Properties of refrigerator oil composition | First phosphorus compound (B) -derived P atom content | | ppm by mass | 710 | 244 | 488 | 420 |
| | Phosphite ester (B') -derived P atom content | | ppm by mass | 0 | 0 | 0 | 0 |
| | Second phosphorus compound (C) -derived P atom content | | ppm by mass | 0 | 0 | 0 | 0 |
| | Compound corresponding to neither First phosphorus compound (B) nor Second phosphorus compound (C) -derived P atom content | | ppm by mass | 0 | 0 | 0 | 0 |
| | Total content of P atoms | | ppm by mass | 710 | 244 | 488 | 420 |
| Evaluation result | Wear amount in FALEX wear test | | mg | 2.3 | 4.9 | 2.4 | 4.6 |
| | | Evaluation | — | A | B | A | B |

TABLE 3

| | | | Unit | Example 22 | Example 23 | Example 24 | Example 25 |
|---|---|---|---|---|---|---|---|
| Base oil (A) | | PAG | % by-mass | — | — | — | — |
| | | PVE | % by-mass | 98.7 | 98.5 | 98.3 | 99.1 |
| First phosphorus compound (B) | First phosphite ester (B1)-1 | Isodecyldiphenyl phosphite | % by-mass | — | — | — | — |
| | First phosphite ester (B1)-2 | 2- ethylhexyldiphenyl phosphite | % by-mass | — | — | — | — |
| | First phosphite ester (B1)-3 | Phenyldiisodecyl phosphite | % by-mass | — | — | — | — |
| | First phosphite ester (B1)-4 | Triphenyl phosphite having three phenyl groups, which is substituted with branched alkyl groups | % by-mass | 0.1 | 0.3 | 0.5 | 0.1 |
| | Second phosphite ester (B2)-1 | Distearyl pentaerythritol diphosphite | % by-mass | — | — | — | — |
| Phosphite ester (B') | Phosphite ester (B')-1 | Trioleyl phosphite | % by-mass | — | — | — | — |
| | Phosphite ester (B)-2 | Trisnonylphenyl phosphite | % by-mass | — | — | — | — |

TABLE 3-continued

| | | | | | | | |
|---|---|---|---|---|---|---|---|
| Second phosphorus compound (C) | Phosphoric acid compound (C1) | Tricresyl phosphate | % by-mass | 0.9 | 0.9 | 0.9 | 0.5 |
| | Organic phosphineoxide compound (C2) | Triphenylphosphine oxide | % by-mass | — | — | — | — |
| Compound corresponding to neither First phosphorus compound (B) nor Second phosphorus compound (C) | | Tetraphenyl-m-phenylenebis phosphate | % by-mass | — | — | — | — |
| Antioxidant | | DBPC | % by-mass | 0.3 | 0.3 | 0.3 | 0.3 |
| Properties of refrigerator oil composition | First phosphorus compound (B) -derived P atom content | | ppm by mass | 49 | 146 | 244 | 49 |
| | Phosphite ester (B) -derived P atom content | | ppm by mass | 0 | 0 | 0 | 0 |
| | Second phosphorus compound (C) -derived P atom content | | ppm by mass | 756 | 756 | 756 | 420 |
| | Compound corresponding to neither First phosphorus compound (B) nor Second phosphorus compound (C) -derived P atom content | | ppm by mass | 0 | 0 | 0 | 0 |
| | Total content of P atoms | | ppm by mass | 805 | 902 | 1000 | 469 |
| Evaluation result | Wear amount in FALEX wear test | | mg | 2.3 | 2.1 | 1.2 | 2.3 |
| | Evaluation | | — | A | A | S | A |

| | | | Unit | Example 26 | Example 27 | Example 28 | Example 29 |
|---|---|---|---|---|---|---|---|
| Base oil (A) | | PAG | % by-mass | — | — | — | — |
| | | PVE | % by-mass | 98.9 | 98.7 | 99.2 | 98.7 |
| First phosphorus compound (B) | First phosphite ester (B1)-1 | Isodecyldiphenyl phosphite | % by-mass | — | — | — | — |
| | First phosphite ester (B1)-2 | 2- ethylhexyldiphenyl phosphite | % by-mass | — | — | — | — |
| | First phosphite ester (B1)-3 | Phenyldiisodecyl phosphite | % by-mass | — | — | — | — |
| | First phosphite ester (B1)-4 | Triphenyl phosphite having three phenyl groups, which is substituted with branched alkyl groups | % by-mass | 0.3 | 0.5 | 0.5 | 1.0 |
| | Second phosphite ester (B2)-1 | Distearyl pentaerythritol diphosphite | % by-mass | — | — | — | — |
| Phosphite ester (B') | Phosphite ester (B')-1 | Trioleyl phosphite | % by-mass | — | — | — | — |
| | Phosphite ester (B)-2 | Trisnonylphenyl phosphite | % by-mass | — | — | — | — |
| Second phosphorus compound (C) | Phosphoric acid compound (C1) | Tricresyl phosphate | % by-mass | 0.5 | 0.5 | — | — |
| | Organic phosphineoxide compound (C2) | Triphenylphosphine oxide | % by-mass | — | — | — | — |
| Compound corresponding to neither First phosphorus compound (B) nor Second phosphorus compound (C) | | Tetraphenyl-m-phenylenebis phosphate | % by-mass | — | — | — | — |
| Antioxidant | | DBPC | % by-mass | 0.3 | 0.3 | 0.3 | 0.3 |
| Properties of refrigerator oil composition | First phosphorus compound (B) -derived P atom content | | ppm by mass | 146 | 244 | 244 | 488 |
| | Phosphite ester (B) -derived P atom content | | ppm by mass | 0 | 0 | 0 | 0 |
| | Second phosphorus compound (C) -derived P atom content | | ppm by mass | 420 | 420 | 0 | 0 |
| | Compound corresponding to neither First phosphorus compound (B) nor Second phosphorus compound (C) -derived P atom content | | ppm by mass | 0 | 0 | 0 | 0 |
| | Total content of P atoms | | ppm by mass | 566 | 664 | 244 | 488 |
| Evaluation result | Wear amount in FALEX wear test | | mg | 2.0 | 1.6 | 4.8 | 1.7 |
| | Evaluation | | — | S | S | B | S |

TABLE 4

| | | | Unit | Comparative Example 1 | 2 | 3 | 4 | 5 | 6 |
|---|---|---|---|---|---|---|---|---|---|
| Base oil (A) | | PAG | % by mass | 98.8 | 99.2 | 98.8 | 99.2 | 98.8 | 99.2 |
| | | PVE | % by mass | — | — | — | — | — | — |
| First phosphorus compound (B) | First phosphite ester (B1)-1 | Isodecyldiphenyl phosphite | % by mass | — | — | — | — | — | — |
| | First phosphite ester (B1)-2 | 2-ethylhexyldiphenyl phosphite | % by mass | — | — | — | — | — | — |
| | First phosphite ester (B1)-3 | Phenyldiisodecyl phosphite | % by mass | — | — | — | — | — | — |
| | First phosphite ester (B1)-4 | Triphenyl phosphite having three phenyl groups, which is substituted with branched alkyl groups | % by mass | — | — | — | — | — | — |
| | Second phosphite ester (B2)-1 | Distearyl pentaerythritol diphosphite | % by mass | — | — | — | — | — | — |
| Phosphite ester (B') | Phosphite ester (B')-1 | Trioleyl phosphite | % by mass | — | — | — | — | 0.9 | — |
| | Phosphite ester (B')-2 | Trisnonylphenyl phosphite | % by mass | — | — | — | — | — | 0.5 |
| Second phosphorus compound (C) | Phosphoric acid compound (C1) | Tricresyl phosphate | % by mass | 0.9 | 0.5 | — | — | — | — |
| | Organic phosphineoxide compound (C2) | Triphenylphosphine oxide | % by mass | — | — | 0.9 | 0.5 | — | — |
| Compound corresponding to neither First phosphorus compound (B) nor Second phosphorus compound (C) | | Tetraphenyl-m-phenylenebis phosphate | % by mass | — | — | — | — | — | — |
| Antioxidant | | DBPC | % by mass | 0.3 | 0.3 | 0.3 | 0.3 | 0.3 | 0.3 |
| Properties of refrigerator oil composition | First phosphorus compound (B) -derived P atom content | | ppm by mass | 0 | 0 | 0 | 0 | 0 | 0 |
| | Phosphite ester (B') -derived P atom content | | ppm by mass | 0 | 0 | 0 | 0 | 333 | 205 |
| | Second phosphorus compound (C) -derived P atom content | | ppm by mass | 756 | 420 | 981 | 545 | 0 | 0 |
| | Compound corresponding to neither First phosphorus compound (B) nor Second phosphorus compound (C) -derived P atom content | | ppm by mass | 0 | 0 | 0 | 0 | 0 | 0 |
| | Total content of P atoms | | ppm by mass | 756 | 420 | 981 | 545 | 333 | 205 |
| Evaluation result) | Wear amount in FALEX wear test | | mg | 6.1 | 8.2 | 5.2 | 7.3 | 14.2 | 5.6 |
| | Evaluation | | | C | C | C | C | C | C |

| | | | Unit | Comparative Example 7 | 8 | 9 | 10 | 11 | 12 |
|---|---|---|---|---|---|---|---|---|---|
| Base oil (A) | | PAG | % by mass | — | — | — | — | 99.5 | 99.2 |
| | | PVE | % by mass | 98.8 | 99.2 | 98.8 | 99.2 | — | — |
| First phosphorus compound (B) | First phosphite ester (B1)-1 | Isodecyldiphenyl phosphite | % by mass | — | — | — | — | — | — |
| | First phosphite ester (B1)-2 | 2-ethylhexyldiphenyl phosphite | % by mass | — | — | — | — | — | — |
| | First phosphite ester (B1)-3 | Phenyldiisodecyl phosphite | % by mass | — | — | — | — | — | — |
| | First phosphite ester (B1)-4 | Triphenyl phosphite having three phenyl groups, which is substituted with branched alkyl groups | % by mass | — | — | — | — | — | — |
| | Second phosphite ester (B2)-1 | Distearyl pentaerythritol diphosphite | % by mass | — | — | — | — | — | — |
| Phosphite ester (B') | Phosphite ester (B')-1 | Trioleyl phosphite | % by mass | — | — | 0.9 | — | — | — |
| | Phosphite ester (B')-2 | Trisnonylphenyl phosphite | % by mass | — | — | — | 0.5 | — | — |

TABLE 4-continued

| | | | | | | | | | |
|---|---|---|---|---|---|---|---|---|---|
| Second phosphorus compound (C) | Phosphoric acid compound (C1) | Tricresyl phosphate | % by mass | 0.9 | 0.5 | — | — | — | — |
| | Organic phosphineoxide compound (C2) | Triphenylphosphine oxide | % by mass | — | — | — | — | — | — |
| Compound corresponding to neither First phosphorus compound (B) nor Second phosphorus compound (C) | | Tetraphenyl-m-phenylenebis phosphate | % by mass | — | — | — | — | 0.2 | 0.5 |
| Antioxidant | | DBPC | % by mass | 0.3 | 0.3 | 0.3 | 0.3 | 0.3 | 0.3 |
| Properties of refrigerator oil composition | First phosphorus compound (B) -derived P atom content | | ppm by mass | 0 | 0 | 0 | 0 | 0 | 0 |
| | Phosphite ester (B') -derived P atom content | | ppm by mass | 0 | 0 | 333 | 205 | 0 | 0 |
| | Second phosphorus compound (C) -derived P atom content | | ppm by mass | 756 | 420 | 0 | 0 | 0 | 0 |
| | Compound corresponding to neither First phosphorus compound (B) nor Second phosphorus compound (C) -derived P atom content | | ppm by mass | 0 | 0 | 0 | 0 | 210 | 530 |
| | Total content of P atoms | | ppm by mass | 756 | 420 | 333 | 205 | 210 | 530 |
| Evaluation result) | Wear amount in FALEX wear test | | mg | 7.1 | 13.9 | 18.7 | 6.7 | 7.6 | 5.1 |
| | Evaluation | | | C | C | C | C | C | C |

From Table 1 to Table 4, the followings can be seen.

It can be found that all the refrigerator oil compositions of Examples 1 to 29 are excellent in the wear resistance.

In contrast, it can be found that as in Comparative Examples 1, 2, 7, and 8, the refrigerator oil composition in which the first phosphorus compound (B) is not blended, and tricresyl phosphate belonging to the phosphoric acid compound (C1) in the second phosphorus compound (C) is blended is inferior in the wear resistance.

Further, it can be found that as in Comparative Examples 3 and 4, the refrigerator oil composition in which the first phosphorus compound (B) is not blended, and triphenyl phosphine oxide belonging to the organic phosphine oxide compound (C2) in the second phosphorus compound (C) is blended is inferior in the wear resistance.

Further, it can be found that as in Comparative Examples 5 and 9, the refrigerator oil composition in which trioleyl phosphite that is a phosphite ester not belonging to the first phosphorus compound (B) is blended is inferior in the wear resistance.

Further, it can be found that as in Comparative Examples 6 and 10, the refrigerator oil composition in which trisnonylphenyl phosphite that is a phosphite ester not belonging to the first phosphorus compound (B) is blended is inferior in the wear resistance.

Further, it can be found that as in Comparative Examples 11 and 12, the refrigerator oil composition in which neither the first phosphorus compound (B) nor the second phosphorus compound (C) is blended, and tetraphenyl-m-phenylenebisphosphate that is a compound belonging to neither the first phosphorus compound (B) nor the second phosphorus compound (C) is blended is inferior in the wear resistance.

<Autoclave Test>

Fe, Cu, and Al as catalysts were put in an autoclave container (volume: 200 mL), and a mixture of 20 g of each of the refrigerator oil compositions of Example 19 and Comparative Examples 6, 11, and 12 and 20 g of a refrigerant (R1234yf) was filled while 2,000 ppm by mass of water was filled. This was maintained at 175° C. for 336 h, and then, the acid value (mgKOH/g) was evaluated.

The acid value was measured by the indicator photometric titration method (see Annex 1 in the JIS standard described on the left) in accordance with JIS K2501:2003.

The evaluation criteria were as follows. The smaller the value of the acid value, the better the thermal stability.

Evaluation A (pass): 0.5 mgKOH/g or less

Evaluation B (failure): greater than 0.5 mgKOH/g and 1.0 mgKOH/g or less

Evaluation C (failure): greater than 1.0 mgKOH/g

The results of the autoclave test are noted in Table 5.

TABLE 5

| | | | Unit | Comparative Example 6 | Comparative Example 11 | Comparative Example 12 | Example 19 |
|---|---|---|---|---|---|---|---|
| Base oil (A) | | PAG | % by mass | 99.2 | 99.5 | 99.2 | 99.2 |
| | | PVE | % by mass | — | — | — | — |
| First phosphorus compound (B) | First phosphite ester (B1)-1 | Isodecyldiphenyl phosphite | -% by mass | — | — | — | — |
| | First phosphite ester (B1)-2 | 2-ethylhexyldiphenyl phosphite | % by mass | — | — | — | — |
| | First phosphite ester (B1)-3 | Phenyldiisodecyl phosphite | % by mass | — | — | — | — |
| | First phosphite ester (B1)-4 | Triphenyl phosphite having three phenyl groups, which is substituted with branched alkyl groups | % by mass | — | — | — | 0.5 |

TABLE 5-continued

| | | | Unit | Comparative Example 6 | Comparative Example 11 | Comparative Example 12 | Example 19 |
|---|---|---|---|---|---|---|---|
| | Second phosphite ester (B2)-1 | Distearyl pentaerythritol diphosphite | % by mass | — | — | — | — |
| Phosphite ester (B') | Phosphite ester (B')-1 | Trioleyl phosphite | % by mass | — | — | — | — |
| | Phosphite ester (B')-2 | Trisnonylphenyl phosphite | % by mass | 0.5 | — | — | — |
| Second phosphorus compound (C) | Phosphoric acid compound (C1) | Tricresyl phosphate | % by mass | — | — | — | — |
| | Organic phosphineoxide compound (C2) | Triphenylphosphine oxide | % by mass | — | — | — | — |
| Compound corresponding to neither First phosphorus compound (B) nor Second phosphorus compound (C) | | Tetraphenyl-m-phenylenebis phosphate | % by mass | — | 0.2 | 0.5 | — |
| Antioxidant | | DBPC | % by mass | 0.3 | 0.3 | 0.3 | 0.3 |
| Properties of refrigerator oil composition | First phosphorus compound (B) - derived P atom content | | ppm by mass | 0 | 0 | 0 | 244 |
| | Phosphite ester (B') -derived P atom content | | ppm by mass | 205 | 0 | 0 | 0 |
| | Second phosphorus compound (C) - derived P atom content | | ppm by mass | 0 | 0 | 0 | 0 |
| | Compound corresponding to neither First phosphorus compound (B) nor Second phosphorus compound (C) -derived P atom content | | ppm by mass | 0 | 210 | 530 | 0 |
| | Total content of P atoms | | ppm by mass | 205 | 210 | 530 | 244 |
| Evaluation result | Acid value after autoclave test | | mgKOH/g | 0.65 | 0.67 | 1.23 | 0.34 |
| | Evaluation | | — | B | B | C | A |

From the results noted in Table 5, the followings can be seen.

It can be seen that the refrigerator oil composition illustrated in Example 19 is excellent in the thermal stability.

In contrast, it can be seen that the thermal stability is inferior when trisnonylphenyl phosphite that is a phosphite ester not corresponding to the first phosphorus compound (B) is used as in Comparative Example 6, or tetraphenyl-m-phenylenebisphosphate that is a compound corresponding to neither the first phosphorus compound (B) nor the second phosphorus compound (C) is used as in Comparative Examples 11 and 12.

The invention claimed is:

1. A refrigerator mixture composition, comprising:

a refrigerant; and a refrigerator oil composition, comprising:

a base oil (A);

a first phosphorus compound (B); and a second phosphorus compound (C), wherein the base oil (A) comprises at least one type of base oil (A2) selected from the group consisting of a polyalkyleneglycol and a polyvinylether, wherein the content of the base oil (A2) is 50 to 100% by mass based on the total amount of the base oil (A), wherein the first phosphorus compound (B) is a reaction product of bis [2,4-bis(2-methylbutane-2-yl)phenyl]4-(2-methylbutane-2-yl)phenyl phosphite, 2,4-bis(2-methylbutane-2-yl)phenylbis [4-(2-methylbutane-2-yl) phenyl]phosphite, and tris [4-(2-methylbutane-2-yl) phenyl]phosphite, wherein the content of the first phosphorus compound (B) is 0.3 to 0.5% by mass based on the total amount of the refrigerator oil composition, wherein the second phosphorus compound (C) is at least one selected from the group consisting of a phosphoric acid compound (C1) and an organic phosphine oxide compound (C2), and wherein the content of the second phosphorus compound (C) is 0.5 to 0.9% by mass based on the total amount of the refrigerator oil composition.

2. The refrigerator mixture composition according to claim 1, wherein a phosphorus atom content is 200 ppm by mass to 1,500 ppm by mass based on a total amount of the refrigerator oil composition.

3. The refrigerator mixture composition according to claim 1, wherein the base oil (A) further comprises at least one selected from the group consisting of a copolymer of poly(oxy)alkyleneglycol or its monoether, a polyolester, and mineral oil.

4. A method of producing a refrigerator oil composition in a refrigerator mixture composition, the method comprising:

mixing a base oil (A) with a first phosphorus compound (B) and a second phosphorus compound (C) to produce a refrigerator oil composition, wherein the base oil (A) comprises at least one type of base oil (A2) selected from the group consisting of a polyalkyleneglycol and a polyvinylether, wherein the content of the base oil (A2) is 50 to 100% by mass based on the total amount of the base oil (A), wherein the first phosphorus compound (B) is a reaction product of bis [2,4-bis(2-methylbutane-2-yl)phenyl]4-(2-methylbutane-2-yl)phenyl phosphite, 2,4-bis(2-methylbutane-2-yl)phenylbis [4-(2-methylbutane-2-yl) phenyl]phosphite, and tris [4-(2-methylbutane-2-yl) phenyl]phosphite, wherein the content of the first phosphorus compound (B) is 0.3 to 0.5% by mass based on the total amount of the refrigerator oil composition, wherein the second phosphorus compound (C) is at least one selected from the group consisting of a phosphoric acid compound (C1) and an organic phosphine oxide compound (C2), wherein the content of the second phosphorus compound (C) is 0.5 to 0.9% by mass based on the total amount of the refrigerator oil composition, and wherein to the refrigerator oil composition, a refrigerant is added thereto.

5. The refrigerator mixture composition according to claim 1, wherein the refrigerant comprises at least one selected from the group consisting of an unsaturated fluorinated hydrocarbon compound, a saturated fluorinated hydrocarbon compound, hydrocarbon, carbon dioxide, and ammonia.

6. The refrigerator mixture composition according to claim 5, wherein the refrigerant comprises an unsaturated fluorinated hydrocarbon compound.

7. The refrigerator mixture composition according to claim 6, wherein the unsaturated fluorinated hydrocarbon compound is 2,3,3,3-tetrafluoropropene (R1234yf).

8. The refrigerator mixture composition according to claim 1, wherein the phosphorus atom content ($B_P$) derived from the first phosphorus compound (B) is 30 ppm by mass to 1,000 ppm by mass based on a total amount of the refrigerator oil composition.

9. The refrigerator mixture composition according to claim 1, wherein the phosphorus atom content ($B_P$) derived from the first phosphorus compound (B) is 146 ppm by mass to 244 ppm by mass based on a total amount of the refrigerator oil composition.

10. The refrigerator mixture composition according to claim 1, wherein the phosphorus atom content ($C_P$) derived from the second phosphorus compound (C) is 200 ppm by mass to 1,200 ppm by mass based on a total amount of the refrigerator oil composition.

11. The refrigerator mixture composition according to claim 1, wherein the phosphorus atom content ($C_P$) derived from the second phosphorus compound (C) is 420 ppm by mass to 981 ppm by mass based on a total amount of the refrigerator oil composition.

* * * * *